United States Patent [19]
Asako et al.

[11] Patent Number: 5,326,489
[45] Date of Patent: Jul. 5, 1994

[54] ELECTRORHEOLOGICAL FLUIDS

[75] Inventors: Yoshinobu Asako, Tsuchiura; Satoru Ono, Tsukuba; Minoru Aoki, Tsukuba; Izuho Okada, Tsukuba; Minoru Kobayashi, Tsukuba; Ryuji Aizawa, Tsukuba, all of Japan

[73] Assignee: Nippon Shokubai Co., Ltd., Osaka, Japan

[21] Appl. No.: 982,627

[22] Filed: Nov. 27, 1992

Related U.S. Application Data

[63] Continuation of Ser. No. 731,491, Jul. 17, 1991, abandoned.

[30] Foreign Application Priority Data

Jul. 20, 1990 [JP] Japan .................... 2-190635

[51] Int. Cl.$^5$ ............... C10M 169/04; C10M 171/00
[52] U.S. Cl. .................... 252/78.1; 252/73; 252/572
[58] Field of Search ............ 252/78.1, 73, 75, 572; 525/333.5, 344, 332.2, 333.3; 521/33; 524/576

[56] References Cited

U.S. PATENT DOCUMENTS 2,597,438  5/1952  Bodamer .................... 525/333.5
3,158,583  11/1964  Corte et al. .................... 525/344

FOREIGN PATENT DOCUMENTS 1-262942  10/1989  Japan .

OTHER PUBLICATIONS

Matsepuro, "Structure Formation in an Electric Field and the Composition of Electrorheological Suspensions", translated from Elektroreol. Issled; Pril., Minsk, pp. 27–51, 1981.

*Primary Examiner*—Christine Skane
*Attorney, Agent, or Firm*—Omri M. Behr; Matthew J. McDonald

[57] ABSTRACT

An electrorheological fluid composition comprising a dispersion of disperse-phase particles formed of a sulfonated polymer possessing aromatic rings substituted with sulfonic acid groups in an electrically non-conducting oil which electrorheological fluid is characterized by the fact that the number of sulfonic acid groups in said sulfonated polymer forming said disperse-phase particles exceeds the number of aromatic rings present in said sulfonated polymer.

23 Claims, No Drawings

ELECTRORHEOLOGICAL FLUIDS

This application is a continuation, of application Ser. No. 07/731,491, now abandoned, filed Jul. 17, 1991.

BACKGROUND OF THE INVENTION

1. Field of the Invention

This invention relates to electrorheological fluid compositions. More particularly, it relates to electrorheological fluid compositions which excel in electrorheological properties in the presence of an electric field as manifested in the phenomenon of generating a large shear stress in response to even a relatively weak electric field applied thereto and consequently causing the current density existent therein to remain at a depressed level during the presence of the large shear stress, also excel in the ability to stabilize the high shear stress and the low current density enough to defy the effect of aging, and find utility in devices of all types operatable with electrorheological fluids such as, for example, actuators for transmission of torque represented by clutches and brakes and actuators for regulation represented by engine mounts, dampers, and valves, and in ink of electrorheological fluid for ink jet system.

2. Description of the Prior Art

The electrotheological fluid is a fluid which is obtained by dispersing and suspending disperse-phase particles of a varying solid substance, for example, in an electrically non-conducting oil and which has rheological properties or properties of flow thereof transformed by increasing electric field strength into visco-plastic properties. Generally, it has been known as a fluid which manifests the so-called Winslow effect, namely the effect of notably gaining in viscosity and inducing a large shear stress in response to an external electric field applied thereto. Since the Winslow effect is characterized in that the viscosity of the electrorheological fluid can be freely controlled with an electric signal and the control can be attained at an extremely high response speed, attempts are being made to adapt electrorheological fluids for use in actuators such as clutches, brakes, engine mounts, dampers, and valves and in ink of electrorheological fluid for ink jet system.

Heretofore, as electrorheological fluids, those products which are obtained by dispersing solid particles such as of cellulose, starch, soybean casein, silica gel, a polystyrenic ion-exchange resin, and a cross-linked polyacrylate in electrically nonconducting oils such as silicone oil, chlorinated biphenyl, and transformer oil have been known to the art.

The electrorheological fluids which use cellulose, starch, and soybean casein as a disperse-phase, however, have a problem of deficiency in the shear stress to be generated in response to an electric field applied thereto. The electrorheological fluids which use a cross-linked polyacrylate as a disperse-phase have a problem of inability to induce a practically sufficient shear stress in response to application of a relatively weak electric field thereto.

The electrorheological fluids which use an ion-exchange resin of the form of an alkali metal salt of polystyrenesulfonic acid, one of the polystyrenic ion-exchange resins, as a disperse-phase derive a large shear stress from application of even a relatively weak electric field. They nevertheless have a problem of large growth of the current density existent therein and deficiency in the ability to stabilize the generated shear stress and current density enough to resist the effect of aging.

The present invention is directed to solving the problems encountered by the conventional electrorheological fluids as described above.

An object of this invention, therefore, is to provide an electrotheological fluid composition which excels in electrorheological properties in the presence of an electric field as manifested in the phenomenon of generating a large shear stress in response to even a relatively weak electric field applied thereto and consequently causing the current density existent therein to remain at a depressed level during the presence of the large shear stress and further excels in the ability to stabilize the generated large shear stress and low current density enough to defy the effect of aging.

SUMMARY OF THE INVENTION

The object described above is accomplished by an electrorheological fluid composition which is produced by dispersing disperse-phase particles of a sulfonated polymer possessing aromatic rings substituted with sulfonic acid groups and which is characterized by the fact that the number of sulfonic acid groups in the sulfonated polymer forming the disperse-phase particles exceeds the number of aromatic rings present in the sulfonated polymer.

The electrorheological fluid composition of this invention excels in electrorheological properties in the presence of an electric field as manifested in the phenomenon of generating a large shear stress in response to even a relatively weak electric field applied thereto and consequently causing the current density existent therein to remain at a depressed level during the presence of the large shear stress and further excels in the ability to stabilize the generated large shear stress and low current density enough to defy the effect of aging, it can be effectively utilized in actuators such as clutches, brakes, engine mounts, dampers, and valves and in ink of electrorheological fluid for ink jet system, for example.

EXPLANATION OF THE PREFERRED EMBODIMENT

The term "sulfonic acid group" as used in this invention refers to what converts itself, in the presence of a polar solvent such as water, into a sulfonic acid ion with disociation of a cation. The cation which is disociated in the presence of a polar solvent such as water is not particularly restricted by reason of its kind. The number of sulfonic acid groups as referred to herein means the total number of sulfonic acid groups which are contained in the sulfonated polymer forming the disperse-phase particles.

The number of sulfonic acid groups which are present in the sulfonated polymer forming the disperse-phase particles to be used in the present invention must exceed the number of aromatic rings present in the sulfonated polymer. Particularly, the number of sulfonic acid groups is desired to be in the range of from 105 to 200 per 100 aromatic rings present in the sulfonated polymer. When the number of sulfonic acid groups in the sulfonated polymer is larger than the number of aromatic rings, the produced electrorheological fluid composition excels in electrorheological properties in the presence of an electric field as manifested in the phenomenon of generating a large shear stress in response to application of an electric field and consequently causing the current density existent therein to remain in a depressed level during the presence of the large shear stress and also excels in the ability to stabilize the generated large shear stress and low current density enough to defy the effect of aging as compared with an electrorheological fluid using a sulfonated polymer wherein the number of sulfoic acid groups is smaller than the number of aromatic rings.

The methods of production of the sulfonated polymer forming the disperse-phase particles which are efficiently usable in this invention can be adopted, for example, as follows; (1) the method is sulfonation of aromatic rings present in (I) a cross-linked polymer of (A) a monomer mixture, which has as essential components thereof (a) a vinyl aromatic compound and (b) a polyvinyl compound and has optionally (c) other vinyl compound, (2) the method is additional sulfonation of aromatic rings present in a dry sulfonated polymer intermediate, which is obtained, for example, from sulfonation of particles of (I) the cross-linked polymer with a sulfonating agent, separation of the sulfonated product from the reaction mixture and dryness of the separated product, and from pulverization of a commercially available polystyrensulfonic acid type ion-exchange resin into particles of a suitable diameter and dryness of the resultant particles.

In the case of adoption of the method (1) mentioned above for the production of the sulfonated polymer to be used in this invention, the increase of the number of sulfonic acid groups in the sulfonated polymer beyond the number of aromatic rings present in the sulfonated polymer necessitates introduction of at least two sulfonic acid groups into the aromatic ring present in the cross-linked polymer.

In order to introduce so many sulfonic acid groups as mentioned above into the aromatic rings, adoption of the following methods proves to be preferable; (1-1) use of a vinyl aromatic compound possessing at least one electron-donating group on the aromatic ring as (a) the vinyl aromatic compound, (1-2) sulfonation of the aromatic rings present in (I) the cross-linked polymer with a specific amount of chlorosulfonic acid, (1-3) sulfonation of the aromatic rings present in (I) the cross-linked polymer with a specific amount of fuming sulfuric acid, (1-4) sulfonation of the aromatic rings present in (I) the cross-linked polymer in the presence of a sulfonating agent and a transition metal salt, or (1-5) sulfonation of the aromatic rings present in (I) the cross-linked polymer in the presence of a sulfonating agent and a pentavalent phosphorus compound.

In the case of adoption of the method of (1-1), the electron-donating groups which are effectively usable herein include alkoxy group, alkyl group, phenoxy group, and amino group. Among the groups mentioned above, the alkoxy group proves to be particularly preferable.

The vinyl aromatic compound possessing at least one electron-donating group on the aromatic rings is preferable to be used as contained in (a) the vinyl aromatic compound in a proportion of not less than 5.0 mol % based on the amount of (A) the monomer mixture. It is particularly preferable to use the vinyl aromatic compound possessing at least one alkoxy group on the aromatic ring in a proportion of not less than 5.0 mol % based on the amount of (A) the monomer mixture. When the vinyl aromatic compound possessing at least one alkoxy group on the aromatic ring is used in the specific proportion mentioned above, increasing the number of sulfonic acid groups in the produced sulfonated polymer beyond the number of aromatic rings in the sulfonated polymer can be performed upon the sulfonation even under mild temperature condition of not higher than 80° C.

In the case of adoption of the method of (1-2), chlorosulfonic acid is preferable to be used in an amount of not less than 600 parts by weight, more preferably falling in the range of from 650 to 2,000 parts by weight, based on 100 parts by weight of (I) the cross-linked polymer. If the amount of chlorosulfonic acid to be used is less than 600 parts by weight, the possibility arises that the reactivity of the sulfonating agent in the reaction mixture will fall with the progress of the sulfonation, resulting in failure of increasing the number of sulfonic acid groups in the produced sulfonated polymer beyond the number of aromatic rings present in the sulfonated polymer.

So long as chlorosulfonic acid as a sulfonating agent is used in an amount of not less than 600 parts by weight based on 100 parts by weight of (I) the cross-linked polymer, other sulfonating agent such as sulfuric acid can be used in combination with chlorosulfonic acid.

In the case of simultaneous use of such other sulfonating agent as mentioned above, the proportion of chlorosulfonic acid to the total amount of all the sulfonating agents being simultaneously used is desired to be not less than 50% by weight. If the proportion of chlorosulfonic acid is less than 50% by weight, the possibility arises that increasing the number of sulfonic acid groups in the produced sulfonated polymer beyond the number of aromatic rings present in the sulfonated polymer will be unsuccessful on the sulfonation.

The other sulfonating agent simultaneously usable herein can be selected from among the known sulfonating agents which include sulfuric acid, sulfur trioxide, and fuming sulfuric acid, for example. These sulfonating agents can be used either singly or jointly in the form of a mixture of at least two ones.

In the case of adoption of the method of (1-3), fuming sulfuric acid is preferable to be used in an amount of not less than 150 parts by weight, more preferably from 200 to 500 parts by weight, based on 100 parts by weight of (I) the cross-linked polymer. If the amount of fuming sulfuric acid to be used is less than 150 parts by weight, the possibility ensues that the reactivity of the sulfonating agent in the reaction mixture will fall with the progress of the sulfonation, resulting in failure of increasing the number of sulfonic acid groups in the produced sulfonated polymer beyond the number of aromatic rings present in the sulfonated polymer.

So long as fuming sulfuric acid as a sulfonating agent is used in a proportion of not less than 150 parts by weight based on 100 parts by weight of (I) the cross-linked polymer, other sulfonating agent such as sulfuric acid can be used in combination with fuming sulfuric acid.

In the case of simultaneous use of such other sulfonating agent, the proportion of fuming sulfuric acid to the total amount of all the sulfonating agents is preferable to be not less than 10% by weight. If the proportion of fumic sulfuric acid is less than 10% by weight, the possibility arises that increasing the number of sulfonic acid groups in the produced sulfonated polymer beyond the number of aromatic groups present in the sulfonated polymer will be unsuccessful on the sulfonation.

The other sulfonating agent simultaneously usable herein can be selected from among the known sulfonating agents which include sulfuric acid, sulfur trioxide, and chlorosulfonic acid, for example. These known sulfonating agents can be used either singly or jointly in the form of a mixture of at least two ones.

In the case of adoption of the method of (1-4), the amount of the transition metal salt to be used in combination with a sulfonating agent is preferable to be in the range of from 0.01 to 10 parts by weight, more preferably from 0.05 to 5 parts by weight, based on 100 parts by weight of (I) the cross-linked polymer. If the amount of the transition metal salt to be used is less than 0.01 part by weight, the possibility arises that the reactivity of the sulfonating agent in the reaction mixture will fall with the progress of the sulfonation and, resulting in failure of increasing the number of sulfonic acid groups in the produced sulfonated polymer beyond the number of aromatic rings present in the sulfonated polymer. If the amount of the transition metal salt to be used exceeds 10 parts by weight, the effect of the combined use will possibly fail to manifest itself.

The transition metal salts which are effectively usable herein include sulfates, nitrates, and chlorides of transition metals such as the elements of Group VIII represented by iron, cobalt, and nickel, the elements of Group IB represented by silver and copper, and the elements of Group IIB represented by zinc and mercury, for example. One salt or a mixture of two or more ones selected from among these transition metal salts can be used suitably.

The sulfonating agent which is used herein in combination with the transition metal salt may be selected from among the known sulfonating agents which include sulfuric acid, sulfur trioxide, chlorosulfonic acid, and fuming sulfuric acid, for example. These sulfonating agents can be used either singly or jointly in the form of a mixture of at least two ones. In terms of the ease of handling, it is preferable to use sulfuric acid. The amount of the sulfonating agent to be used is not particularly restricted but can be properly decided suitably.

In the case of adoption of the method of (1-5), the amount of the pentavalent phosphorus compound to be used in combination with a sulfonating agent is preferable to be not less than 1.0 part by weight, more preferably to fall in the range of from 10 to 500 parts by weight, based on 100 parts by weight of (I) the cross-linked polymer. If the amount of the pentavalent phosphorus compound to be used is less than 1.0 part by weight, the possibility arises that the reactivity of the sulfonating agent in the reaction mixture will fall with the progress of the sulfonation, resulting in failure of increasing the number of sulfonic acid groups in the produced sulfonated polymer beyond the number of aromatic rings present in the sulfonated polymer.

The pentavalent phosphorus compounds which are effectively usable herein include phosphorus pentoxide, phosphorus oxychloride, land phosphorus pentachloride, for example. One compound or a mixture of at least two ones selected from among these pentavalent phosphorus compounds may be used suitably.

The sulfonating agent which is used in combination with the pentavalent phosphorus compound may be selected from among the known sulfonating agents which include sulfuric acid, sulfur trioxide, chlorosulfonic acid, and fuming sulfuric acid, for example. These sulfonating agents can be used either singly or jointly in the form of a mixture of two or more ones. In terms of the ease of handling, it is desirable to use sulfuric acid. The amount of the sulfonating agent to be used is not particularly restricted but can be properly decided suitably.

When the sulfonated polymer to be used in the present invention is produced by the method of (2) mentioned above, the increase of then umber of sulfonic acid groups in the sulfonated polymer beyond the number of aromatic rings present in the sulfonated polymer necessitates introduction of at least two sulfonic acid groups into the aromatic ring present in the particles of the dry sulfonated polymer intermediate.

In order to so many sulfonic acid groups as mentioned above into the aromatic rings, it is preferable to adopt the method of additional sulfonation of the aromatic rings in the particles of the dry sulfonated polymer intermediate with a specific amount of chlorosulfonic acid and/or fuming sulfuric acid (2-1).

In the case of adoption of the method of (2-1), the additional sulfonation of the particles of the dry sulfonated polymer intermediate is desired to be carried out at least once.

A second-step additional sulfonation of the particles of the sulfonated polymer, obtained from the first-step additional sulfonation, separation from the reaction mixture and dryness, with a fresh supply of a sulfonating agent can be carried out optionally. The number of cycles of the additional sulfonation is desired to be in the range of from 1 to 3.

The amount of chlorosulfonic acid and/or fuming sulfuric acid to be used as a sulfonating agent is desired to not less than 100 parts by weight and particularly desired to fall in the range of from 120 to 500 parts by weight, based on 100 parts by weight of the dry sulfonated polymer intermediate. If the amount of chlorosulfonic acid and/or fuming sulfuric acid to be used is less than 100 parts by weight, the possibility arises that the reactivity of the sulfonating agent in the reaction mixture will fall with the progress of the sulfonation, resulting in failure of increasing the number of sulfonic acid groups in the produced sulfonated polymer beyond the number of aromatic rings present in the sulfonated polymer.

So long as chlorosulfonic acid and/or fuming sulfuric acid is used as a sulfonating agent in an amount of not less than 100 parts by weight, based on 100 parts by weight of the dry sulfonated polymer intermediate, other sulfonating agent such as, sulfuric acid can be used in combination with chlorosulfonic acid and/or fuming sulfuric acid.

In the case of combined use of the chlorosulfonic acid and/or fuming sulfuric acid with the other sulfonating agent, the proportion of chlorosulfonic acid and/or fuming sulfuric acid to the total amount of all the sulfonating agents is desired to be not less than 10% by weight. If the proportion of chlorosulfonic and/or fuming sulfuric acid is less than 10% by weight, the possibility arises that increasing the number of sulfonic acid groups in the produced sulfonated polymer beyond the number of aromatic rings present in the sulfonated polymer will be unsuccessful on the sulfonation.

The other sulfonating agent to be adopted for the combined use can be selected from among the known sulfonating agents which include sulfuric acid and sulfur trioxide, for example. These sulfonating agents may be used either singly or jointly in the form of a mixture of two or more ones.

The expression "particles of the dry sulfonated polymer intermediate" as used in the description of the method of (2-1) does not mean absolutely dry particles but means the dry particles which have been separated from the reaction mixture and, don't have surface still wetted with the reaction medium.

The vinyl aromatic compounds (a) which are effectively usable in the present invention include vinyl aromatic hydrocarbons such as styrene, vinylnaphthalene, vinylanthracene, and vinylphenanthrene; vinyl aromatic compounds possessing at least one alkoxy group on the aromatic ring thereof such as methoxystyrene, dimethoxystyrene, trimethoxystyrene, ethoxystyrene, diethoxystyrene, triethoxystyrene, propyloxystyrene, dipropyloxystyrene, tripropyloxystyrene, methoxy methylstyrene, methoxy ethylstyrene, methoxy propylstyrene, ethoxy methylstyrene, ethoxy ethylstyrene, propyloxy methylstyrene, propyloxy ethylstyrene, methoxy dimethylstyrene, methoxy diethylstyrene, vinyl methoxynaphthalene, vinyl dimethoxynaphthalene, vinyl ethoxynaphthalene, vinyl diethoxynaphthalene, vinyl methoxy methylnaphthalene, vinyl methoxy dimethylnaphthalene, vinyl dimethoxy methylnaphthalene, vinyl methoxy ethylnaphthalene, vinyl methoxy diethylnaphthalene, and vinyl dimethoxy ethylnaphthalene; vinyl aromatic compounds possessing at least one alkyl group on the aromatic ring thereof such as methylstyrene, ethylstyrene, propylstyrene, butylstyrene, pentylstyrene, hexylstyrene, dimethylstyrene, diethylstyrene, dipropylstyrene, methyl ethylstyrene, methyl propylstyrene, methyl hexylstyrene, ethyl butylstyrene, ethyl propylstyrene, ethyl hexylstyrene, propyl butylstyrene, trimethylstyrene, triethylstyrene, tripropylstyrene, methyl diethylstyrene, dimethyl ethylstyrene, methyl ethyl propylstyrene, methyl dipropylstyrene, dimethyl propylstyrene, ethyl dipropylstyrene, diethyl propylstyrene, vinyl methylnaphthalene, vinyl ethylnaphthalene, vinyl propylnaphthalene, vinyl dimethylnaphthalene, vinyl diethylnaphthalene, vinyl dipropylnaphthalene, vinyl methyl ethylnaphthalene, vinyl trimethylnaphthalene, vinyl triethylnaphthalene, vinyl tripropylnaphthalene, vinyl methyl diethylnaphthalene, vinyl dimethyl ethylnaphthalene, and vinyl methyl ethyl propylnaphthalene; vinyl aromatic compounds possesing at least one aryloxy group on the aromatic ring thereof such as phenoxystyrene, phenoxy methylstyrene, phenoxy ethylstyrene, phenoxy dimethylstyrene, and phenoxy diethylstyrene; vinyl aromatic compounds possessing at least one amino group on the aromatic ring thereof such as aminostyrene, N-methylaminostyrene, N,N-dimethylaminostyrene, amino methylstyrene, amino ethylstyrene, and N,N-dimethylamino methylstyrene; and vinyl aromatic compounds possessing at least one halogen group on the aromatic ring thereof such as chlorostyrene, bromostyrene, fluorostyrene, chloro methylstyrene, chloro ethylstyrene, chloro propylstyrene, chloro dimethylstyrene, bromo methylstyrene, bromo ethylstyrene, fluoro methylstyrene, fluoro ethylstyrene, vinyl chloronaphthalene, and vinyl bromonaphthalene, for example. One compound or a mixture of two or more ones selected from among the vinyl aromatic compounds cited above can be used.

In the present invention, (b) the polyvinyl compound is preferable to be used in a proportion in the range of from 0.1 to 50 mol % based on the amount of (A) the monomer mixture. If the proportion of (b) the polyvinyl compound to the monomer mixture exceeds 50 mol %, the disadvantage possibly occurs that the sulfonation will proceed with difficulty and the electrorheological fluid using the produced particles will not generate a large shear stress in response to an electric field applied thereto. Conversely, if this proportion is less than 0.1 mol %, the disadvantage possibly occurs that the particles of the cross-linked polymer resulting from polymerization will aggregate when the cross-linked polymer is subjected to sulfonation.

The polyvinyl compounds (b) which are effectively usable in the present invention include polyvinyl aromatic compounds such as divinylbenzene, divinyltoluene, divinylxylene, divinyl ethylbenzene, divinyl propylbenzene, divinylnaphthalene, trivinylbenzene, trivinyltoluene, trivinylxylene, and trivinylnaphthalene, and polyvinyl aliphatic compounds such as ethylene glycol di(meth)acrylates, diethylene glycol di(meth)acrylates, trimethylolpropane tri(meth)acrylates, N,N'-methylenebisacrylamide, diallyl maleate, and diallyl adipate, for example. One compound or a mixture of two or more ones selected from among the polyvinyl compounds cited above can be used.

In the production of the sulfonated polymer in the present invention, (A) the monomer mixture which is the raw materials for (I) the cross-linked polymer usable advantageously as the intermediate for the sulfonated polymer has as essential components thereof (a) the vinyl aromatic compound and (b) the polyvinyl compound. The total proportions of (a) the vinyl aromatic compound and (b) the polyvinyl compound to be used is preferably not less than 50 mol % based on the amount of (A) the monomer mixture.

The proportions of the (a) vinyl aromatic compound and (b) the polyvinyl compound in (A) the monomer mixture are preferable to be in the ranges of from 50.0 to 99.9 mol % and from 50.0 to 0.1 mol %, respectively.

Besides (a) the vinyl aromatic compound and (b) the polyvinyl compound mentioned above, (A) the monomer mixture in the present invention can consist of (c) other vinyl compound therein. The proportion of (c) the other vinyl compound to be additionally used is preferable to be not more than 50 mol % in (A) the monomer mixture. The other vinyl compounds which are additionally used effectively herein include olefinic hydrocarbons and these halogenated derivatives such as ethylene, propylene, isoprene, butadiene, vinyl chloride, and chloroprene; esters of unsaturated carboxylic acids such as methyl (meth)acrylates and ethyl (meth)acrylates; vinyl ester compounds of monovalent carboxylic acids such as vinyl acetate and vinyl propionate; unsaturated amide compounds and these derivatives such as (meth)acrylamides, diacetone acrylamide, and exymethylated (meth)acrylamides; unsaturated cyan compounds such as (meth)acrylonitriles and crotononitrile; unsaturated alcohol compounds such as (meth)allyl alcohols and crotyl alcohol; unsaturated monobasic acids such as (meth)acrylic acids; unsaturated dibasic acids such as maleic acid, fumaric acid, and itaconic acid; and monoesters of an unsaturated dibasic acid with an alcohol such as monomethyl maleate and monpallyl maleate, for example. One compound or a mixture of two or more ones selected from among the vinyl compounds cited above may be used.

The disperse-phase particles to be used in the present invention are preferable to be in the form of spheres or ellipsoids. If the disperse-phase particles have a form other than that of spheres or ellipsoids, the disadvantage may possible arise that the produced electrorheological fluid will fail to generate a large shear stress in response to an electric field applied thereto or will be deficient in the ability to stabilize itself enough to defy the effect of aging under continued application of an electric field.

The methods for production of (I) the cross-linked polymer to be used advantageously in the present invention as the intermediate for the sulfonated polymer is not particularly restricted but can be selected from among the known methods of polymerization which include suspension polymerization, emulsion polymerization, dispersion polymerization, solution polymerization, and bulk polymerization, for example. It is preferable, however, to adopt the suspension polymerization or emulsion polymerization because it allows easy production of (I) the cross-linked polymer in the form of spheres or ellipsoids.

In the case of adoption of the suspension polymerization as a method for production of (I) the cross-linked polymer in the present invention, the conditions for the polymerization have no particular restriction.

Generally water is used as a dispersion medium for the suspension polymerization.

The dispersant to be used for the suspension polymerization can be generally selected from among the known dispersants which include polyvinyl alcohol, carboxymethyl cellulose, ammonium salt of styrene-maleic anhydride copolymer, bentonite, sodium poly(meth)acrylates, and poly(diallylmethyl ammonium chloride), for example.

The polymerization initiators which are effectively usable for the suspension polymerization include peroxides such as benzoyl peroxide, tert-butyl hydroxyperoxide, lauroyl peroxide, methyl ethyl ketone peroxide, tert-butyl perphthalate, and caproyl peroxide and azo compounds such as azo-bis-isobutyronitrile, azo-bis-isobutylamide, 2,2'-azo-bis-(2,4-dimethylmaleronitrile), azo-bis-(α-dimethylvaleronitrile), and azo-bis-(α-methylbutyronitrile), for example. One initiator or a mixture of two or more ones selected from among the polymerization initiators cited above can be suitably used.

During the suspension polymerization, a known inhibitor for emulsion polymerization may be used, when necessary, for the purpose of depressing the otherwise possible occurrence of inadequate fine particles.

The suspension polymerization is generally carried out at a temperature in the range of from 50° to 100° C. for a period in the range of from 2 to 30 hours.

The suspension polymerization can be carried out, for example, by a procedure which comprises charging a reactor with water and a dispersant, adding a monomer mixture having a polymerization initiator dissolved in advance to the reactor, controlling particles size distribution of the monomer droplets by the use of a dispersing device or a stirring device, and heating the resultant mixture at a prescribed temperature as kept in a suspended state.

In the case of adoption of the emulsion polymerization method for production of (I) the cross-linked polymer in the present invention, the conditions for this polymerization have no particular restriction.

Generally water is used as a dispersion medium for the emulsion polymerization.

The emulsifier to be used for the emulsion polymerization may be generally selected from among the known surfactants which include sodium lauryl salfate and polyoxyethylene stearates, for example.

The polymerization initiator to be used for the emulsion polymerization may be generally selected from among the known polymerization initiators which include sodium persulfate and ammonium persulfate, for example.

The emulsion polymerization is generally carried out at a temperature in the range of from 50° to 100° C. for a period in the range of from 2 to 40 hours.

The methods for effecting the emulsion polymerization can be selected from among the known method which include the method of seed polymerization, the method of emulsion polymerization which is characterized by adding a monomer mixture at a time to a reactor initially, the method of emulsion polymerization characterized by adding a monomer mixture partly to a reactor with the progress of the polymerization and the method of emulsion polymerization characterized by adding a emulsion having a monomer mixture partly to a reactor with the progress of the polymerization, for example.

The method of seed polymerization is generally carried out by a procedure which comprises first charging a reactor with seed latices, water, and an emulsifier, stirring the seed latices and the emulsifier in water until homogeneous dispersion is obtained, adding a monomer mixture partly or, when necessary, wholly to the resultant dispersion, then heating the resultant mixture to a prescribed temperature, subsequently adding a polymerization initiator to the heated mixture thereby initiating polymerization of the monomers dispersed therein, adding further thereto the remaining part of the monomer mixture continuously or intermittently, and heating the mixture in an emulsified state at a prescribed temperature.

In the present invention, (I) the cross-linked polymer may be either a substantially non-porous cross-linked polymer which is generally referred to as a gel type or a porous cross-linked polymer which is obtained by polymerizing a monomer mixture in the presence of a known pore-forming agent such as, for example, an organic solvent in which the produced cross-linked polymer swells, an organic solvent in which the produced cross-linked polymer doesn't swell, or a linear polymer soluble in a monomer mixture in order to give porosity to the cross-linked polymer from polymerization.

The sulfonated polymer which forms the disperse-phase particles to be used in the present invention is obtained by sulfonating (I) the cross-linked polymer and, when necessary, pulverizing or granulating the sulfonated polymer into particles of a suitable diameter or by sulfonating (I) the cross-linked polymer thereby preparing particles of a sulfonated polymer intermediate, subjecting dry particles of the sulfonated polymer intermediate to additional sulfonation and, when necessary, pulverizing or granulating the additionally sulfonated particles into particles of a suitable diameter. It is preferable to use the particles of cross-linked polymer obtained by suspension polymerization or emulsion polymerization as (I) the cross-linked polymer, because the particles of the sulfonated polymer suitable as the disperse-phase in the present invention can be directly obtained by sulfonating the particles of (I) the cross-linked polymer or by additionally sulfonating the particles of the sulfonated polymer intermediate.

The sulfonation of (I) the cross-linked polymer can be carried out in the presence of a solvent in which (I) the cross-linked polymer swells or doesn't swell. It can be carried out in the absence of a solvent.

The solvent in which (I) the cross-linked polymer doesn't swell necessitates inertness against the sulfonating agent. The solvents which possess the properties include aliphatic hydrocarbons such as hexane, cyclohexane, and ligroine, for example.

The solvent in which (I) the cross-linked polymer swells necessitates inertness against the sulfonating agent. The solvents which possess the properties include halogenated hydrocarbons such as dichloroethane, trichloroethylene, tetrachloroethane, propylene dichloride, and carbon tetrachloride and aromatic hydrocarbons such as nitrobenzene and xylene, for example.

The amount of the solvent to be used is desired to be less than 1,000 parts by weight and particularly desired to fall in the range of from 200 to 700 parts by weight, based on 100 parts by weight of (I) the cross-linked polymer.

The sulfonating agent for producing the sulfonated polymer by the sulfonation of (I) the cross-linked polymer or by the additional sulfonation of the sulfonated polymer intermediate can be selected from among the known sulfonating agents which include chlorosulfonic acid, fuming sulfuric acid, sulfur trioxide, and sulfuric acid, for example. One agent or a mixture of two or more ones selected from among the sulfonating agents can be used. It is particularly desirable to use chlorosulfonic acid or fuming sulfuric acid because it enables the sulfonation to proceed easily even at a mild temperature condition of not higher than 80° C. to the extent of increasing the number of sulfonic acid groups in the produced sulfonated polymer beyond the number of aromatic rings present therein.

The sulfonating agent to be used in producing the sulfonated polymer intermediate by the sulfonation of (I) the cross-linked polymer has no particular restriction and can be selected from among the known sulfonating agents which include chlorosulfonic acid, fuming sulfuric acid, sulfur trioxide, and sulfuric acid, for example. One agent or a mixture of two or more ones selected from among the sulfonating agents mentioned above can be used.

In production of the sulfonated polymer by sulfonation of (I) the cross-linked polymer, it is desirable to use a transition metal salt or a pentavalent phosphorus compound in combination with the sulfonating agent because this combined use enables the sulfonation to proceed even at a mild temperature of not higher than 80° C. to the extent of increasing the number of sulfonic acid groups in the produced sulfonated polymer beyond the number of aromatic rings present therein.

The sulfonation in the production of the sulfonated polymer by the sulfonation of (I) the cross-linked polymer is carried out at a temperature in the range of from −20° to 250° C. for a period approximately in the range of from 0.3 to 100 hours.

In the case of adoption of the method of (1-1) mentioned above for the production of the sulfonated polymer forming the disperse-phase particles of this invention, (I) the cross-linked polymer can be sulfonated to produce the sulfonated polymer easily at a temperature of not higher than 80° C., a level commercially favorable by reason of the restriction on the material of the reactor, by using (A) a monomer mixture so composed that the proportion of a vinyl aromatic compound possessing at least one electron-donating group on the aromatic ring thereof to the amount of (A) the monomer mixture is not less than 5.0 mol %, preferably (A) a monomer mixture so composed that the proportion of a vinyl aromatic compound possessing at least one alkoxy group on the aromatic rings thereof to the amount of (A) the monomer mixture is not less than 5.0 mol %.

As method for sulfonation of (I) the cross-linked polymer obtained by using a vinyl aromatic compound possessing at least one alkoxy group on the aromatic ring in a proportion of not less than 5.0 mol % in (A) a monomer mixture, a method which comprises sulfonating the polymer at a temperature in the range of from 50° to 80° C. for a period in the range of from 0.3 to 48 hours, and a method which comprises sulfonating the polymer at a temperature in the range of from −20° to 50° C. for a period in the range of from 0.3 to 10 hours, and then at a temperature in the range of from 50° to 80° C. for a period in the range of from 0.3 to 48 hours, can be cited. In view of the ease with which the reaction of sulfonation is controlled, the latter method is more desirable than the former method.

In the case of adoption of the aforementioned method of (1-2), (1-3), (1-4), or (1-5) for the production of the sulfonated polymer forming the disperse-phase particles of the present invention, (I) the cross-linked polymer can be sulfonated to produce the sulfonated polymer easily at a temperature of not higher than 80° C., a level commercially favorable by reason of the restriction on the material for the reactor respectively by using chlorosulfonic acid in an amount of not less than 600 parts by weight based on 100 parts by weight of (I) the cross-linked polymer, by using fuming sulfuric acid in an amount of not less than 150 parts by weight based on 100 parts by weight of (I) the cross-linked polymer, by using a transition metal salt particularly in an amount in the range of from 0.01 to 10 parts by weight, based on 100 parts by weight of (I) the cross-linked polymer in combination with the sulfonating agent, or by using a pentavalent phosphorus compound particularly in an amount of not less than 1.0 parts by weight based on 100 parts by weight of (I) the cross-linked polymer in combination with the sulfonating agent.

As method for sulfonation of (I) the cross-linked polymer by the use of chlorosulfonic acid in an amount of not less than 600 parts by weight based on 100 parts by weight of (I) the cross-linked polymer, or by the use of fuming sulfuric acid in an amount of not less than 150 parts by weight based on 100 parts by weight of (I) the cross-linked polymer, a method which comprises sulfonating (I) the cross-linked polymer at a temperature of not lower than 70° C., preferably falling in the range of from 70° to 90° C., for a period of not less than 30 minutes, preferably falling in the range of from 1 to 12 hours, and a method which comprises sulfonating the polymer at a temperature in the range of from −20° to 70° C. for a period in the range of from 0.3 to 30 hours and then at a temperature of not less than 70° C., preferably falling in the range of from 70° to 90° C., for a period of not less than 30 minutes, preferably falling in the range of from 1 to 5 hours can be cited. In view of the ease with which the reaction of sulfonation is controlled, the latter method is more desirable than the former method.

As method for sulfonation of (I) the cross-linked polymer obtained by using a transition metal salt in an amount in the range of from 0.01 to 10 parts by weight based on 100 parts by weight of (I) the cross-linked polymer in combination with the sulfonating agent, or by the use of a pentavalent phosphorus compound in an amount of not less than 1.0 part by weight based on 100 parts by weight of (I) the cross-linked polymer in combination with the sulfonating agent, a method which comprises sulfonating (I) the cross-linked polymer at a temperature of not lower than 60° C., preferably falling in the range of from 60° to 90° C., for a period of not less than 30 minutes, preferably falling in the range of from 1 to 5 hours, and a method which comprises sulfonating the polymer at a temperature in the range of from −20° to 60° C. for a period from 0.3 to 30 hours and then at a temperature of not lower than 60° C., preferably falling in the range of from 60° to 90° C., for a period of not less than 30 minutes, preferably falling in the range of from 1 to 5 hours can be cited. In view of the ease with which the reaction of sulfonation is controlled, the latter method is more desirable than the former method.

The sulfonation for the production of the sulfonated polymer intermediate by the sulfonation of (I) the cross-linked polymer is carried out at a temperature in the range of from −20° to 250° C., preferably from 70° to 90° C., for a period in the range of from 0.3 to 100 hours, preferably from 1 to 12 hours.

The sulfonation for the production of the sulfonated polymer by the additional sulfonation of the sulfonated polymer intermediate is carried out at a temperature in the range of from −20° to 250° C. for a period of from 0.3 to 100 hours, preferably at a temperature in the range of from −20° to 90° C. for a period in the range of from 10 to 50 hours.

The particles of sulfonated polymer which are obtained by the sulfonation of (I) the cross-linked polymer or by the additional sulfonation of the sulfonated polymer intermediate as described above are desired to be separated from the reaction mixture and then thoroughly washed with a large amount of water for the removal of extraneous substances such as acid still remaining in the particles. Then, the resulting particles can be neutralized or treated for ion-exchange, when necessary, for the conversion of the cation of the sulfonic acid group from proton to a suitable cation.

The cation of the sulfonic acid group present in the sulfonated polymer forming the disperse-phase particles to be used in the present invention has no particular restriction. The cations which are available for the sulfonic acid group include cation species of hydrogen; alkali metals such as lithium, sodium, and potassium; alkaline earth metals such as magnesium and calcium; Group IIIA metals such as aluminum; Group IVA metals such as tin and lead; and transition metals such as zinc and iron, and ammonium, organic quaternary ammonium, pyridinium, and guanidium, for example. One cation or a mixture of two or more ones selected from among these cations hay be used.

The disperse-phase particles to be used in the present invention are desired to contain water in an amount of not more than 10 parts by weight, preferably falling in the range of from 1.0 to 5 parts by weight, based on 100 parts by weight of the sulfonated polymer forming the particles. Owing to containing a small amount of water in the disperse-phase particles, the electrorheological fluid composition of this invention is enabled to generate a large shear stress in response to application of an electric field thereto. If the water content in the disperse-phase particles is more than 10 parts by weight, however, the disadvantage arises that the electrorheological fluid composition allows flow of a large electric current in response to the application of an electric field because aggregation of the disperse-phase particles occurs or the produced electrorheological fluid composition incurs a decrease in the ellectrically non-conducting property.

The disperse-phase particles to be used in the present invention are desired to have an average particle diameter in the range of from 0.1 to 100 μm, preferably from 1 to 50 μm. In the electrorheological fluid composition of the present invention, the shear stress which the produced electrorheological fluid composition generates in response to the application of an electric field thereto tends to decrease in accordance as the diameter of the disperse-phase particles decreases. If the average particle diameter of the disperse-phase particles is less than 0.1 μm, the problem may possibly arise that the produced electrorheological fluid composition will fail to generate a large shear stress in response to the application of an electric field. Conversely, if the average particle diameter of the disperse-phase particles exceeds 100 μm, the problem may possibly arise that the shear stress which the produced electrotheological fluid composition generates in response to the application of an electric field of a certain level is irregular and difficult of stabilization.

The electrically non-conducting oil which can be used in the present invention has no particular restriction. The electrically non-conducting oils which are effectively usable herein include silicone oils such as polydimethyl siloxane and polyphenylmethyl siloxane; hydrocarbons such as liquid paraffin, decane, dodecane, methylnaphthalene, dimethylnaphthalene, ethylnaphthalene, biphenyl, decalin, and partially hydrogenated triphenyl; ether compounds such as diphenyl ether; halogenated hydrocarbons such as chlorobenzene, dichlorobenzene, trichlorobenzene, bromobenzene, dibromobenzene, chloronaphthalene, dichloronaphthalene, bromonaphthalene, chlorobiphenyl, dichlorobiphenyl, trichlorobiphenyl, bromobiphenyl, chlorodiphenylmethane, dichlorodiphenylmethane, trichlorodiphenylmethane, bromodiphenylmethane, chlorodecane, dichlorodecane, trichlorodecane, bromodecane, chlorododecane, dichlorododecane, and bromododecane; halogenated diphenyl ether compounds such as chlorodiphenyl ether, dichlorodiphenyl ether, trichlorodiphenyl ether, and bromodiphenyl ether; fluorides such as Daifloyl (proprietary product of Daikin Industries, Ltd.) and Demnam (proprietary product of Daikin Industries, Ltd.); and esters such as dioctyl phthalate, trioctyl trimellitate, and dibutyl sebacate, for example. Among the electrically non-conducting oils cited above, silicone oils, hydrocarbons, ether compounds, and halogenated hydrocarbons prove to be particularly desirable. One oil or a mixture of two or more ones selected from among the ellectrically non-conducting oils mentioned above can be used.

The electrorheological fluid composition of this invention is produced by dispersing the disperse-phase particles in an electrically non-conducting oil. The mixing ratio of the disperse-phase particles to the electrically non-conducting oil is desired to be such that the amount of the latter component falls in the range of from 50 to 500 parts by weight, preferably from 200 to 400 parts by weight, based on 100 parts by weight of the former component. If the amount of the oil exceeds 500 parts by weight, the possibility arises that the produced electrorheological fluid composition will fail to generate an efficiently large shear stress in response to the application of an electric field. Conversely, if this amount is less than 50 parts by weight, the possibility arises that flowability of the produced fluid will decrease and serve as an electrorheological fluid with difficulty.

In the present invention, the electrorheological fluid composition can contain therein various additives such as surfactant, polymeric dispersant, and polymeric thickener for the purpose of improving the dispersibility of the disperse-phase particles in the electrically nonconducting oil, adjusting the viscosity of the fluid, or enhancing the shear stress.

Now, the present invention will be described below with reference to working examples. It should be noted, however, that the scope of the present invention is not limited only to these examples.

EXAMPLE 1

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was dissolved in the water, and a mixture consisting of 300 g of methoxystyrene, 30 g of industrial grade divinylbenzene (mixture of 55% by weight of divinylbenzene and 35% by weight of ethylstyrene; produced by Wako Pure Chemical Industries, Ltd.), and 4 g of azo-bis-isobutyronitrile was added to the resultant solution. Thereafter, the contents of the flask were dispersed by stirring at a speed of 650 rpm and heated for polymerization at 70° C. for 13 hours. The solid particles consequently produced in the flask were separated by filtration, thoroughly washed with water, and dried with a hot air drier at 80° C. for 12 hours, to afford 305 g of spheres of cross-linked polymer (hereinafter referred to as "cross-linked polymer (1)").

In a four-necked separable flask having an inner volume of 2 liters and provided with a stirrer, a thermometer and a dropping funnel, 50 g of the cross-linked polymer (1) and 250 g of tetrachloroethane were stirred and, cooled to 0° C. with an ice bath. Then, 250 g of chlorosulfonic acid was added to the stirred mixture through the dropping funnel over a period of 2 hours, to give a dispersion. Then, the flask was removed from the ice bath and the contents of the flask were stirred at ambient temperature (20° C.) for 5 hours, heated to 70° C., and heated and stirred at the same temperature for 12 hours for sulfonation. After the reaction mixture in the flask was poured into water at 0° C., solid particles obtained were separated by filtration and then washed with water and acetone.

The solid particles consequently obtained were neutralized with 250 ml of an aqueous 10 wt % sodium hydroxide solution and thoroughly washed with water. Then, they were dried with a vacuum drier at 80° C. for 10 hours, to give 107 g of disperse-phase particles formed of spheres of sulfonated polymer (hereinafter referred to as "disperse-phase particles (1)").

By use of a particle size analyzer (produced by Shimadzu Corporation and marketed under trademark designation of "SALD-1000"), the average particle diameter of the disperse-phase particles (1) was measured and found to be 45 μm.

The number of sulfonic acid groups in the sulfonated polymer forming the disperse-phase particles (1) was found by neutralization titration to be 172 based on 100 aromatic rings in the sulfonated polymer and by elemental analysis to be 169 based on 100 aromatic rings.

By use of a Karl-Fischer moisture meter (produced by Kyoto Electronics Manufacturing Co., Ltd. and marketed under produce code of "MPS-3P"), the water content of the disperse-phase particles (1) was measured and found to be 2.8 parts by weight.

An electrotheological fluid conforming to the present invention (hereinafter referred to as "fluid composition (1)") was obtained by stirring and dispersing 30 g of the disperse-phase particles (1) in 70 g of dimethyl silicone oil (produced by Shin-Etsu Chemical Co., Ltd. and marketed under trademark designation of "Shin-Etsu Silicone il KF96-20CS").

EXAMPLE 2

In a four-necked separable flask having an inner volume of 2 liters and provided with a stirrer and a thermometer, 50 g of the cross-linked polymer (1) obtained in Example 1 was placed and cooled to 0° C. with an ice bath. Then, 300 g of chlorosulfonic acid was added to the stirred mixture through the dropping funnel over a period of 2 hours, to give a dispersion. Then, the flask was removed from the ice bath and the contents of the flask were stirred at ambient temperature (20° C.) for 5 hours, heated to 70° C., and heated and stirred at the same temperature for 10 hours for sulfonation of the polymer. After the reaction mixture was poured into water at 0° C. sold particles obtained were separated by filtration and washed with water.

The solid particles consequently obtained were neutralized with 390 ml of an aqueous 10 wt % potassium hydroxide solution and thoroughly washed with water. Then, they were dried with a vacuum drier at 80° C. for 10 hours, to afford 125 g of disperse-phase particles formed of spheres of sulfonated polymer (hereinafter referred to as "disperse-phase particles (2)").

By use of the particle size analyzer, the average particle diameter of the disperse-phase particles (2) was measured and found to be 45 μm.

The number of sulfonic acid groups in the sulfonated polymer forming the disperse-phase particles (2) was found by neutralization titration to be 186 based on 100 aromatic rings in the sulfonated polymer and by elemental analysis to be 182 based on 100 aromatic rings.

The water content of the disperse-phase particles (2), by use of the Karl-Fischer moisture meter, was measured and found to be 2.7 parts by weight.

An electrorheological fluid conforming to the present invention (hereinafter referred to as "fluid composition (2)") was obtained by stirring and dispersing 30 g of the disperse-phase particles (2) in 70 g of partially hydrogenated triphenyl (produced by Nippon Steel Chemical Co., Ltd. and marketed under trademark designation of "Therm-S 900").

EXAMPLE 3

In a four-necked separable flask having an inner volume of 3 liters and provided with a stirrer, a reflux condenser and a thermometer, 1.2 liters of water was placed, 10.0 g of polyvinyl alcohol (produced by Kuraray Co., Ltd. and marketed under trademark designation of "Kuraray Poval PVA-205") was dissolved in the water, and a mixture consisting of 200 g of methoxystyrene, 50 g of styrene, 30 g of the same industrial grade divinylbenzene as used in Example 1, and 4 g of azo-bis-isobutyronitrile was added to the resultant solution. Thereafter, the contents of the flask were dispersed by stirring at a speed of 500 rpm and heated at 70° C. for 12 hours for polymerization. The solid particles consequently formed were separated by filtration, washed thoroughly with water, and dried with a hot air drier at 80° C. for 12 hours, to afford 255 g of spheres of cross-linked polymer (hereinafter referred to as "cross-linked polymer (2)").

In a four-necked separable flask having an inner volume of 2 liters and provided with a stirrer, a thermometer and a dropping funnel, 50 g of the cross-linked polymer (2) and 300 g of dichloroethane were placed, stirred and cooled to 0° C. with an ice bath and subsequently 250 g of chlorosulfonic acid was added to the cooled mixture through the dropping funnel over a period of 2 hours, to form a dispersion. Then, the flask was removed from the ice bath and the contents of the flask were stirred at ambient temperature (20° C.) for 5 hours, heated to 70° C., and heated and stirred at the same temperature for 14 hours for sulfonation of the polymer. After the reaction mixture was poured into water at 0° C., solid particles obtaine were separated by filtration and washed with water and acetone.

The solid particles consequently obtained were neutralized with 150 ml of an aqueous 10 wt % lithium hydroxide solution and then washed thoroughly with water. The washed solid particles were dried with a vacuum drier at 80° C. for 10 hours, to afford 99 g of disperse-phase particles formed of spheres of sulfonated polymer (hereinafter referred to as "disperse-phase particles (3)").

By use of the particle size analyzer the average particle diameter of the disperse-phase particles (3) was measured and found to be 55 $\mu$m.

The number of sulfonic acid groups in the sulfonated polymer forming the disperse-phase particles (3) was found by neutralization titration to be 162 based on 100 aromatic rings in the sulfonated polymer and by elemental analysis to be 160 based on 100 aromatic rings.

The water content of the disperse-phase particles (3), by use of the Karl-Fischer moisture meter, was measured and found to be 2.6 parts by weight.

An electrotheological fluid conforming to the present invention (hereinafter referred to as "fluid composition (3)") was obtained by stirring and dispersing 30 g of the disperse-phase particles (3) in 70 g of bromobenzene.

EXAMPLE 4

In a four-necked separable flask having an inner volume of 2 liters and provided with a stirrer and a thermometer, 200 g of 30 wt % fuming sulfuric acid and 300 g of tetrachloroethane were placed, stirred and cooled to 0° C. with an ice bath. Then, the cross-linked polymer (2) obtained in Example 3 was added to the cooled mixture over a period of 1 hour, to form a dispersion. The flask was removed from the ice bath and the contents of the flask were stirred at ambient temperature (20° C.) for 4 hours, then heated to 60° C., and heated and stirred at the same temperature for 18 hours for sulfonation of the polymer. Then, the resultant reaction mixture was poured into water at 0° C. and solid particles were separated by filtration and washed with water and acetone.

The solid particles consequently produced were neutralized with 210 ml of an aqueous 10 wt % sodium hydroxide solution and then washed thoroughly with water. They were then dried with a vacuum drier at 80° C. for 10 hours, to afford 96 g of disperse-phase particles formed of spheres of sulfonated polymer (hereinafter referred to as "disperse-phase particles (4)").

By use of the particle size analyzer the average particle diameter of the disperse-phase particles (4) was measured and found to be 55 $\mu$m.

The number of sulfonic acid groups in the sulfonated polymer forming the disperse-phase particles (4) was found by neutralization titration to be 131 based on 100 aromatic rings in the sulfonated polymer and by elemental analysis to be 132 based on 100 aromatic rings.

The water content of the disperse-phase particles (4), by use of the Karl-Fischer moisture meter, was measured and found to be 2.5 parts by weight.

An electrorheological fluid conforming to the present invention (hereinafter referred to as "fluid composition (4)") was obtained by mixing and dispersing 30 g of the disperse-phase particles (4) in 70 g of dimethyl silicone oil (produced by Shin-Etsu Chemical Co., Ltd. and marketed under trademark designation of "Shin-Etsu Silicone Oil KF96-100CS").

EXAMPLE 5

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added thereto and dissolved therein, and a mixture consisting of 30 g of methoxystyrene, 130 g of styrene, 80 g of methylstyrene, 60 g of the same industrial grade divinylbenzene as used in Example 1, 300 g of isooctane, and 12 g of azo-bis-isobutyronitrile was added thereto. Then, the contents of the flask were dispersed by the use of a dispersing device (operated at a speed of 5,000 rpm) and heated for polymerization at 70° C. for 11 hours. The solid particles consequently formed were separated by filtration, washed thoroughly with acetone and water, and then dried with a hot air drier at 80° C. for 12 hours, to afford 280 g of spheres of cross-linked polymer (hereinafter referred to as "cross-linked polymer (3)").

In a four-necked separable flask having an inner volume of 2 liters and provided with a stirrer, a thermometer and a dropping funnel, 50 g of the cross-linked polymer (3) and 250 g of nitrobenzene were placed, stirred and cooled to 0° C. with an ice bath. Then, 300 g of chlorosulfonic acid was added to the cooled mixture through the dropping funnel over a period of 2 hours, to give a dispersion. The flask was removed from the ice bath and the contents of the flask were stirred at ambient temperature (20° C.) for 5 hours, heated to 70° C. and heated and stirred at the same temperature for 18 hours for sulfonation of the polymer. The resultant reaction mixture was poured into water at 0° C. and solid particles were separated by filtration and washed with water and acetone.

The solid particles consequently formed were neutralized with 250 ml of an aqueous 10 wt % potassium hydroxide solution and washed thoroughly with water. Then, they were dried with a vacuum drier at 80° C. for 10 hours, to afford 97 g of disperse-phase particles formed of spheres of sulfonated polymer (hereinafter referred to as "disperse-phase particles (5)").

By use of the particle size analyzer, the average particle diameter of the disperse-phase particles (5) was measured and found to be 10 $\mu$m.

The number of sulfonic acid groups in the sulfonated polymer forming the disperse-phase particles (5) was found by neutralization titration to be 109 based on 100 aromatic rings in the sulfonated polymer and by elemental analysis to be 106 based on 100 aromatic rings.

The water content of the disperse-phase particles (5), by use of the Karl-Fischer moisture meter, was measured and found to be 3.0 parts by weight.

An electrorheological fluid conforming to the present invention (hereinafter referred to as "fluid composition (5)") was obtained by mixing and dispersing 30 g of the disperse-phase particles (5) in 70 g of 1,2,4-trichlorobenzene.

EXAMPLE 6

In a four-necked flask having an inner volume of 300 ml and provided with a stirrer, a reflux condenser, a thermometer and a dropping funnel, 50 ml of water, 0.4 g of sodium lauryl sulfate, and 1.0 g of dodecane were placed and the resultant mixture was emulsified by the use of a dispersing device. The emulsified mixture and 50 ml of water, 0.2 g of sodium persulfate, 30 g of methoxystyrene, 15 g of styrene, and 15 g of the same industrial grade divinylbenzene as used in Example 1 added thereto were stirred and heated at 50° C. for 8 hours for polymerization, to give 160 ml of an emulsion of seed latices.

Then, in a four-necked flask having an inner volume of 3 liters and provided with a stirrer, a reflux condenser, a thermometer and a dropping funnel, 1.2 liters of water was placed and 160 ml of the emulsion of seed latices prepared as described above and 2.8 g of sodium lauryl sulfate were added to the water and then uniformly dispersed therein by stirring. The dispersion consequently formed was kept stirred with the stirrer operated at a speed of 250 rpm and heated to 70° C. and a solution of 2 g of sodium persulfate in 10 ml of water was added to the stirred and heated dispersion. Then, a mixture consisting of 120 g of methoxystyrene, 60 g of styrene, and 60 g of the same industrial gradedivinyl benzene as used in Example 1 was added dropwise thereto over a period of 18 hours. The resultant mixture was heated for reaction at 70° C. for 5 hours, heated at 90° C. for 3 hours, and caused to cease reaction. The solid particles consequently obtained were separated by filtration and dried with a hot air drier at 80° C. for 12 hours, to afford 265 g of spheres of cross-linked polymer (hereinafter referred to as "cross-linked polymer (4)").

In a four-necked separable flask having an inner volume of 2 liters and provided with a stirrer, a thermometer and a dropping funnel, 50 g of the cross-linked polymer (4) and 300 g of heptane were placed, stirred and cooled to 0° C. with an ice bath. Then, 300 g of chlorosulfonic acid was added to the cooled mixture through the dropping funnel over a period of 2 hours, to form a dispersion. The flask was removed from the ice bath and the contents of the flask were stirred at ambient temperature (20° C.) for 5 hours, then heated to 70° C., and heated and stirred at the same temperature for 24 hours for sulfonation of the polymer. The resultant reaction mixture was poured into water at 0° C. and solid particles were separated by filtration and washed with water and acetone.

The solid particles consequently obtained were neutralized with 220 ml of an aqueous 10 wt % sodium hydroxide solution and then washed thoroughly with water. Then, they were dried with a vacuum drier at 80° C. for 10 hours, to produce 100 g of disperse-phase particles formed of spheres of sulfonated polymer (hereinafter referred to as "disperse-phase particles (6)").

By use of the particle size analyzer, the average particle diameter of the disperse-phase particles (6) was measured and found to be 5 μm.

The number of sulfonic acid groups in the sulfonated polymer forming the disperse-phase particles (6) was found by neutralization titration to be 142 based on 100 aromatic rings in the sulfonated polymer and by elemental analysis to be 139 based on 100 aromatic rings.

The water content of the disperse-phase particles (6), by use of the Karl-Fischer moisture meter, was measured and found to be 2.9 parts by weight.

An electrorheological fluid conforming to the present invention (hereinafter referred to as "fluid composition (6)") was obtained by mixing and dispersing 30 g of the disperse-phase particles (6) in 70 g of a partially hydrogenated triphenyl (produced by Nippon Steel Chemical Co., Ltd. and marketed under trademark designation of "Therm-S 900").

EXAMPLE 7

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture consisting of 90 g of methoxystyrene, 90 g of styrene, 120 g of the same industrial grade divinylbenzene as used in Example 1, and 4 g of azo-bis-isobutyronitrile was added thereto. Thereafter, the contents of the flask were dispersed with the stirrer operated at a speed of 400 rpm and heated for polymerization at 70° C. for 12 hours. The solid particles consequently obtained were separated by filtration, washed thoroughly with water and heated with a hot air drier at 80° C. for 12 hours, to produce 282 g of spheres of cross-linked polymer (hereinafter referred to as "cross-linked polymer (5)").

In a four-necked separable flask having an inner volume of 2 liters and provided with a stirrer, a thermometer and a dropping funnel, 50 g of the cross-linked polymer (5) and 300 g of dichloroethane were placed, stirred and cooled to 0° C. with an ice bath. Then, 250 g of chlorosulfonic acid was added to the resultant mixture through the dropping funnel over a period of 2 hours, to form a dispersion. Then, the flask was removed from the ice bath and the contents of the flask were stirred at ambient temperature (20° C.) for 5 hours, heated to 70° C. and heated and stirred at the same temperature for 16 hours for sulfonation of the polymer. Then, the resultant reaction mixture was poured into water at 0° C. and solid particles were separated by filtration and washed with water and acetone.

The solid particles consequently obtained were neutralized with 40 g of pyridine and then washed thoroughly with water. Then, they were dried with a vacuum drier at 80° C. for 10 hours, to afford 123 g of disperse-phase particles formed of spheres of sulfonated polymer (hereinafter referred to as "dispersed-phase particles (7)").

By use of the particle size analyzer, the average particle diameter of the disperse-phase particles (7) was measured and found to be 75 μm.

The number of sulfonic acid groups in the sulfonated polymer forming the disperse-phase particles (7) was found by neutralization titration to be 122 based on 100 aromatic rings in the sulfonated polymer and by elemental analysis to be 120 based on 100 aromatic rings.

The water content of the disperse-phase particles (7), by use of the Karl-Fischer moisture meter, was measured and found to be 3.1 parts by weight.

An electrorheological fluid conforming to the present invention (hereinafter referred to as "fluid composition (7)") was obtained by mixing and dispersing 30 g of the disperse-phase particles (7) in 70 g of liquid paraffin.

EXAMPLE 8

In a four-necked separable flask having an inner volume of 3 liters and provided with a stirrer, a reflux condenser and a thermometer, 1.2 liters of water was placed., 16.0 g of polyvinyl alcohol (produced by Kuraray Co., Ltd. and marketed under trademark designation of "Kuray Poval PVA-205") was added to the water and dissolved therein, and a mixture comprising 50 g of dimethoxystyrene, 150 g of styrene, 60 g of methylstyrene, 40 g of the same industrial grade divinylbenzene as used in Example 1, and 4 g of azo-bis-isobutyronitrile was added thereto. Thereafter, the contents of the flask were dispersed with the stirrer operated at a speed of 670 rpm and heated for polymerization at 70° C. for 14 hours. The resultant solid particles were separated by filtration, washed thoroughly with water and dried with a hot air drier at 80° C. for 12 hours, to afford 291 g of spheres of cross-linked polymer (hereinafter referred to as "cross-linked polymer (6)").

In a four-necked separable flask having an inner volume of 2 liters and provided with a stirrer and a thermometer, 250 g of 30 wt% fuming sulfuric acid and 250 g of dichloroethane were placed, stirred and simultaneously cooled to 0° C. with an ice bath. Then, the cross-linked polymer (6) was added to the resultant mixture over a period of 1 hour to form a dispersion. The flask was removed from the ice bath and the contents of the flask were stirred at ambient temperature (20° C.) for 4 hours, heated to 60° C., and heated and stirred at the same temperature for 15 hours for sulfonation. The resultant reaction mixture was poured into water at 0° C. and solid particled were separated by filtration and washed with water and acetone.

The resultant solid particles were neutralized with 180 ml of an aqueous 10 wt % sodium hydroxide and then washed thoroughly with water. They were subsequently dried with a vacuum drier at 80° C. for 10 hours, to afford 89 g of disperse-phase particles formed of spheres of sulfonated polymer (hereinafter referred to as "disperse-phase particles (8)").

By use of the particle size analyzer, the average particle diameter of the disperse-phase particles (8) was measured and found to be 40 μm.

The number of sulfonic acid groups in the sulfonated polymer forming the disperse-phase particles (8) was found by neutralization titration to be 109 based on 100 aromatic rings in the sulfonated polymer and by elemental analysis to be 106 based on 100 aromatic rings.

The water content of the disperse-phase particles (8), by use of the Karl-Fischer moisture meter, was measured and found to be 2.6 parts by weight.

An electrorheological fluid conforming to the present invention (hereinafter referred to as "fluid composition (8)") was obtained by mixing and dispersing 30 g of the disperse-phase particles (8) in 70 g of dimethyl silicone oil (produced by Shin-Etsu Chemical Co., Ltd. and marketed under trademark designation of "Shin-Etsu Silicone Oil KF96-50CS").

EXAMPLE 9

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture comprising 160 g of ethoxystyrene, 70 g of styrene, 50 g of chlorostyrene, 30 g of the same industrial grade divinylbenzene as used in Example 1, and 4 g of azo-bis-isobutyronitrile was added thereto. Thereafter, the contents of the flask were dispersed with a dispersing device (operated at a speed of 10,000 rpm) and heated for polymerization at 70° C. for 13 hours. The solid particles consequently obtained were separated by filtration, washed thoroughly with water, and dried with a hot air drier at 80° C. for 12 hours, to afford 287 g of spheres of cross-linked polymer (hereinafter referred to as "cross-linked polymer (7)").

In a four-necked separable flask having an inner volume of 2 liters and provided with a stirrer and a thermometer, 50 g of the cross-linked polymer (7) was placed and cooled with an ice bath to 0° C. Then, 300 g of chlorosulfonic acid in a stirred state was added to the cooled polymer through the dropping funnel over a period of 2 hours, to form a dispersion. The flask was removed from the ice bath and the contents of the flask were stirred at ambient temperature (20° C.) for 5 hours, heated to 70° C. and heated and stirred at the same temperature for 13 hours for sulfonation of the polymer. The resultant reaction mixture was poured into water at 0° C. and solid particles were separated by filtration and washed with water.

The solid particles consequently obtained were neutralized with 210 ml of an aqueous 10 wt % sodium hydroxide solution and then washed thoroughly with water. Then, they were dried with a vacuum drier at 80° C. for 10 hours, to produce 97 g of disperse-phase particles formed of spheres of sulfonated polymer (hereinafter referred to as "disperse-phase particles (9)").

By use of the particle size analyzer, the average particle diameter of the disperse-phase particles (9) was measured and found to be 5 μm.

The number of sulfonic acid groups in the sulfonated polymer forming the disperse-phase particles (9) was found by neutralization titration to be 144 based on 100 aromatic rings in the sulfonated polymer and by elemental analysis to be 141 based on 100 aromatic rings.

The water content of the disperse-phase particles (9), by use of the Karl-Fischer moisture meter, was measured and found to be 2.8 parts by weight.

An electrorheological fluid conforming to the present invention (hereinafter referred to as "fluid composition (9)") was obtained by mixing and dispersing 30 g of the disperse-phase particles (9) in 70 g of a mixture of biphenyl with diphenyl ether (produced by Nippon Steel Chemical Co., Ltd. and marketed under trademark designation of "Therm-S 300").

EXAMPLE 10

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "kuraray Poval PVA-205") was added to the water and dissolved therein, and a mixture consisting of 170 g of methoxy methylstyrene, 100 g of styrene, 30 g of the same industrial grade divinylbenzene as used in Example 1, 30 g of polystyrene of a degree of polymerization of 1,600 to 1,800 (produced by Wako Pure Chemical Industries, Ltd.), and 4 g of azo-bis-isobutyronitrile was added thereto. Then, the contents of the flask were dispersed with a dispersing device (operated at a speed of 8,000 rpm) and heated for polymerization at 70° C. for 13 hours. The solid particles consequently obtained were separated by filtration, washed thoroughly with acetone and water and dried with a hot air drier at 80° C. for 12 hours, to afford 289 g of spheres of cross-linked polymer (hereinafter referred to as "cross-linked polymer (8)").

In a four-necked separable flask having an inner volume of 2 liters and provided with a stirrer, a thermometer and a dropping funnel, 50 g of the cross-linked polymer (8) and 300 g of tetrachloroethane were placed, stirred and cooled to 0° C. with an ice bath. Then, 250 g of chlorosulfonic acid was added to the cooled mixture through the dropping funnel over a period of 2 hours, to form a dispersion. The flask was removed from the ice bath and the contents of the flask were stirred at ambient temperature (20° C.) for 5 hours, heated to 70° C., and heated and stirred at the same temperature for 15 hours for sulfonation of the polymer. The resultant reaction mixture was poured into water at 0° C. and solid particles were separated by filtration, and washed with water and acetone.

The solid particles consequently obtained were neutralized with 220 ml of an aqueous 10 wt % sodium hydroxide solution and then washed thoroughly with water. Then, they were dried with a vacuum drier at 80° C. for 10 hours, to afford 100 g of disperse-phase particles formed of spheres of sulfonated polymer (hereinafter referred to as "disperse-phase particles (10)").

By use of the particle size analyzer, the average particle diameter of the disperse-phase particles (10) was measured and found to be 8 μm.

The number of sulfonic acid groups in the sulfonated polymer forming the disperse-phase particles (10) was found by neutralization titration to be 147 based on 100 aromatic rings in the sulfonated polymer and by elemental analysis to be 144 based on 100 aromatic rings.

The water content of the disperse-phase particles (10), by use of the Karl-Fischer moisture meter, was found to be 2.7 parts by weight.

An electrorheological fluid conforming to the present invention (hereinafter referred to as "fluid composition (10)) was obtained by mixing and dispersing 30 g of the disperse-phase particles (10) in 70 g of partially hydrogenated triphenyl (produced by Nippon Steel Chemical Co., Ltd. and marketed under trademark designation of "Therm-S 900").

EXAMPLE 11

In a four-necked separable flask having an inner volume of 5 liters and provided with a stirrer, a reflux condenser and a thermometer, 2.4 liters of water was placed, 32.0 g of polyvinyl alcohol (produced by Kuraray Co., Ltd. and marketed under trademark designation of "Kuraray Poval PVA-205") was added to the water and dissolved therein, and a mixture comprising 500 g of styrene, 100 g of the same industrial grade divinylbenzene as used in Example 1, and 8 g of azo-bis-isobutyronitrile was added thereto. Thereafter, the contents of the flask were dispersed with the stirrer operated at a speed of 600 rpm and heated at 80° C. for 8 hours to polymerization. The solid particles consequently obtained were separated by filtration, washed thoroughly with water, and dried with a hot air drier at 80° C. ror 12 hours, to afford 573 g of spheres of cross-linked polymer (hereinafter referred to as "cross-linked polymer (9 )").

In a four-necked separable flask having an inner volume of 2 liters and provided with a stirrer, a thermometer and a dropping funnel, 50 g of the cross-linked polymer (9) and 200 g of tetrachloroethane were placed, stirred and cooled to 0° C. with an ice bath. Then, 350 g of chlorosulfonic acid was added to the cooled mixture through the dropping funnel over a period of 2 hours, to form a dispersion. The flask was removed from the ice bath and the contents of the flask were stirred at ambient temperature (20° C.) for 24 hours, heated to 80° C. and heated and stirred at the same temperature for 2 hours for sulfonation of the polymer. The resultant reaction mixture was poured into water at 0° C. and solid particles were separated by filtration and washed with water and acetone.

The solid particles consequently obtained were neutralized with 200 ml of an aqueous 10 wt % sodium hydroxide solution and then washed thoroughly with water. Then, they were dried with a vacuum drier at 80° C. for 10 hours, to afford 94 g of disperse-phase particles formed of spheres of sulfonated polymer (hereinafter referred to as "disperse-phase particles (11)").

By use of the particle size analyzer, the average particle diameter of the disperse-phase particles (11) was measured and found to be 50 μm.

The number of sulfonic acid groups in the sulfonated polymer forming the disperse-phase particles (11) was found by neutralization titration to be 108 based on 100 aromatic rings in the sulfonated polymer and by elemental analysis to be 106 based on 100 aromatic rings.

The water content of the disperse-phase particles (11), by use of the Karl-Fischer moisture meter, was measured and found to be 2.5 parts by weight.

An electrorheological fluid conforming to the present invention (hereinafter referred to as "fluid composition (11)") was obtained by mixing and dispersing 30 g of the disperse-phase particles (11) in 70 g of dimethyl silicone oil (produced by Shin-Etsu Chemical Co., Ltd. and marketed under trademark designation of "Shin-Etsu Silicone Oil KF96-20CS").

EXAMPLE 12

In a four-necked separable flask having an inner volume of 2 liters and provided with a stirrer, a thermometer and a dropping funnel, 50 g of the cross-linked polymer (9) obtained in Example 11 was placed and stirred and cooled to 0° C. with an ice bath. Then, 500 g of chlorosulfonic acid was added to the cooled polymer through the dropping funnel over a period of 2 hours, to form a dispersion. Then, the flask was removed from the ice bath and the contents of the flask were stirred at ambient temperature (20° C.) for 12 hours. The resultant reaction mixture was heated to 90° C. and heated and stirred at the same temperature for 3 hours for sulfonation of the polymer. After the reaction mixture was poured into water at 0° C., solid particles were separated by filtration and washed with water and acetone.

The solid particles consequently obtained were neutralized with 330 ml of an aqueous 10 wt % potassium hydroxide solution and then washed thoroughly with water. Then, they were dried with a vacuum drier at 80° C. for 10 hours, to afford 115 g of disperse-phase particles formed of spheres of sulfonated polymer (hereinafter referred to as "disperse-phase particles (12)").

By use of the particle size analyzer, the average particle diameter of the disperse-phase particles (12) was measured and found to be 50 μm.

The number of sulfonic acid groups in the sulfonated polymer was found by neutralization titration to be 136 based on 100 aromatic rings in the sulfonated polymer and by elemental analysis to be 131 based on 100 aromatic rings.

The water content of the disperse-phase particles (12), by use of the Karl-Fischer moisture meter, was measured and found to be 2.4 parts by weight.

An electrorheological fluid conforming to the present invention (hereinafter referred to as "fluid composition (12)") was obtained by mixing and dispersing 30 g of the disperse-phase particles (12) in 70 g of partially hydrogenated triphenyl (produced by Nippon Steel Chemical Co., Ltd. and marketed under trademark designation of "Therm-S 900").

EXAMPLE 13

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture consisting of 200 g of styrene, 70 g of chlorostyrene, 30 g of the same industrial grade divinylbenzene as used in Example 1, and 5 g of benzoyl peroxide was added thereto. Thereafter, the contents of the flask were dispersed with the stirrer operated at a speed of 400 rpm and heated for polymerization at 80° C. for 9 hours. The solid particles consequently obtained were separated by filtration, washed thoroughly with water and dried with a hot air drier at 80° C. for 12 hours, to afford 290 g of spheres of cross-linked polymer (hereinafter referred to as "cross-linked polymer (10)").

In a four-necked separable flask having an inner volume of 2 liters and provided with a stirrer, a thermometer and a dropping funnel, 50 g of the cross-linked polymer (10) and 250 g of 98 wt % concentrated sulfuric acid were placed, stirred and cooled to 0° C. with an ice bath. Then, 350 g of chlorosulfonic acid was added to the cooled mixture through the dropping funnel over a period of 2 hours, to form a dispersion. Then, the flask was removed from the ice bath and the contents of the flask were stirred at ambient temperature (20° C.) for 5 hours. The resultant reaction mixture was heated to 80° C., and heated and stirred at the same temperature for 13 hours for sulfonation of the polymer. After the reaction mixture was poured into water at 0° C. solid particles were separated by filtration and washed with water and acetone.

The solid particles consequently obtained were neutralized with 120 ml of an aqueous 10 wt % lithium hydroxide solution and then washed thoroughly with water. Then, they were dried with a vacuum drier at 80° C. for 10 hours, to afford 84 g of disperse-phase particles formed of spheres of sulfonated polymer (hereinafter referred to as "disperse-phase particles (13)").

By use of the particle size analyzer, the average particle diameter of the disperse-phase particles (13) was measured and found to be 66 μm.

The number of sulfonic acid groups in the sulfonated polymer forming the disperse-phase particles (13) was found by neutralization titration to be 110 based on 100 aromatic rings in the sulfonated polymer and by elemental analysis to be 111 based on 100 aromatic rings.

The water content of the disperse-phase particles (13), by use of the Karl-Fischer moisture meter, was measured and found to be 2.8 parts by weight.

An electrorheological fluid conforming to the present invention (hereinafter referred to as "fluid composition (13)") was obtained by mixing and dispersing 30 g of the disperse-phase particles (13) in 70 g of bromobenzene.

EXAMPLE 14

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture comprising 140 g of styrene, 130 g of methoxystyrene, 30 g of the same industrial grade divinylbenzene as used in Example 1, and 5 g of azo-bis-isobutyronitrile was added thereto. Then, the contents of the flask were dispersed by a dispersing device (operated at a speed of 5,000 rpm) and heated for polymerization at 80° C. for 12 hours. The solid particles consequently formed were separated by filtration, washed thoroughly with water and dried with a hot air drier at 80° C. for 12 hours, to afford 291 g of spheres of cross-linked polymer (hereinafter referred to as "cross-linked polymer (11)").

In a four-necked separable flask having an inner volume of 2 liters and provided with a stirrer, a thermometer and a dropping funnel, 50 g of the cross-linked polymer (11) and 200 g of dichloroethane were placed, stirred and cooled to 0° C. with an ice bath. Then, 400 g of chlorosulfonic acid was added to the cooled mixture through the dropping funnel over a period of 2 hours, to form a dispersion. The flask was then removed from the ice bath and the contents of the flask were stirred at ambient temperature (20° C.) for 6 hours. The resultant reaction mixture was heated to 80° C. and heated and stirred at the same temperature for 7 hours for sulfonation of the polymer. After the reaction mixture was poured into water at 0° C., solid particles were separated by filtration and then washed with water and acetone.

The solid particles consequently obtained were neutralized with 250 ml of an aqueous 10 wt % sodium hydroxide solution and washed thoroughly with water. Then, they were dried with a vacuum drier at 80° C. for 10 hours, to afford 109 g of disperse-phase particles formed of spheres of sulfonated polymer (hereinafter referred to as "dispersed particles (14)").

By use of the particle size analyzer, the average particle diameter of the disperse-phase particles (14) was measured and found to be 12 μm.

The number of sulfonic acid groups in the sulfonated polymer forming the disperse-phase particles (14) was found by neutralization titration to be 150 based on 100 aromatic rings in the sulfonated polymer and by elemental analysis to be 153 based on 100 aromatic rings.

The water content of the disperse-phase particles (14), by use of the Karl-Fischer moisture meter, was measured and found to be 2.6 parts by weight.

An electrorheological fluid conforming to the present invention (hereinafter referred to as "fluid composition (14)") was obtained by mixing and dispersing 30 g of the disperse-phase particles (14) in 70 g of 1,2,4-trichlorobenzene.

EXAMPLE 15

In a four-necked separable flask having an inner volume of 2 liters and provided with a stirrer, a thermometer and a dropping funnel, 50 g of the cross-linked polymer (11) obtained in Example 14 was placed, stirred and cooled to 0° C. with an ice bath. Then, 500 g of chlorosulfonic acid was added to the cooled polymer through the dropping funnel over a period of 2 hours, to form a dispersion. The flask was then removed from the ice bath and the contents of the flask were stirred at ambient temperature (20° C.) for 24 hours. The resultant reaction mixture was heated to 90° C. and heated and stirred at the same temperature for 45 minutes for sulfonation of the polymer. Then, the reaction mixture was poured into water at 0° C. and solid particles were separated by filtration and washed with water and acetone.

The solid particles consequently obtained were neutralized with 260 ml of an aqueous 10 wt % sodium hydroxide solution and then washed thoroughly with water. Then, they were dried with a vacuum drier at 80° C. for 10 hours, to afford 108 g of disperse-phase particles formed of spheres of sulfonated polymer (hereinafter referred to as "disperse-phase particles (15)").

By use of the particle size analyzer, the average particle diameter of the disperse-phase particles (15) was measured and found to be 12 μm.

The number of sulfonic acid groups in the sulfonated polymer forming the disperse-phase particles (15) was found by neutralization titration to be 156 based on 100 aromatic rings in the sulfonated polymer and by elemental analysis to be 155 based on 100 aromatic rings.

The water content of the disperse-phase particles (15), by use of the Karl-Fischer moisture meter, was measured and found to be 2.5 parts by weight.

An electrorheological fluid conforming to the present invention (hereinafter referred to as "fluid composition (15)") was obtained by mixing and dispersing 30 g of the disperse-phase particles (15) in 70 g of a mixture of biphenyl with diphenyl ether (produced by Nippon Steel Chemical Co., Ltd. and marketed under trademark designation of "Therm-S 300").

EXAMPLE 16

In a four-necked flask having an inner volume of 300 ml and provided with a stirrer, a reflux condenser, a thermometer and a dropping funnel, 50 ml of water, 0.4 g of sodium lauryl sulfate, and 1.0 g of dodecane were placed, the resultant mixture was emulsified by the use of a dispersing device, 50 ml of water, 0.2 g of sodium persulfate, 30 g of styrene, 15 g of methylstyrene, and 15 g of the same industrial grade divinylbenzene as used in Example 1 were added to the emulsion, and the resultant mixture was stirred and heated at 50° C. for 8 hours for polymerization. Consequently, there was obtained 160 ml of an emulsion of seed latices.

Subsequently, in a four-necked flask having an inner volume of 3 liters and provided with a stirrer, a reflux condenser, a thermometer and a dropping funnel, 1.2 liters of water was placed and 160 ml of the emulsion of seed latices prepared as described above and 2.8 g of sodium lauryl sulfate were added to the water and stirred until thorough dispersion. The resultant mixture was kept stirred with the stirrer operated at a speed of 250 rpm and heated to 70° C. and, in the meantime, a solution of 2 g of sodium persulfate in 10 ml of water was added to the stirred mixture. Subsequently, a mixture comprising 120 g of styrene, 60 g of methylstyrene, and 60 g of the same industrial divinylbenzene as used in Example 1 was added dropwise thereto over a period of 18 hours. The reaction mixture was further left reacting at the same temperature for 5 hours, then heated at 90° C. for 3 hours, and caused to cease reaction. The solid particles consequently obtained were separated by filtration and dried with a hot air drier at 80° C. for 12 hours, to produce 267 g of spheres of cross-linked polymer (hereinafter referred to as "cross-linked polymer (12)").

In a four-necked separable flask having an inner volume of 2 liters and provided with a stirrer, a thermometer and dropping funnel, 50 g of the cross-linked polymer (12), 170 g of 98 wt % concentrated sulfuric acid, and 200 g of dichloroethane were placed, stirred and cooled to 0° C. with an ice bath. Then, 330 g of chlorosulfonic acid was added to the cooled mixture through the dropping funnel over a period of 2 hours, to form a dispersion. The flask was then removed from the ice bath and the contents of the flask were stirred at ambient temperature (20° C.) for 24 hours. The reaction mixture was heated to 90° C., and further heated and stirred at the same temperature for sulfonation of the polymer for 1 hour. Subsequently, the reaction mixture was poured into water at 0° C. and solid particles were separated by filtration and washed with water and acetone.

The solid particles consequently formed were neutralized with 200 ml of an aqueous 10 wt % sodium hydroxide solution and then washed thoroughly with water. Then, they were dried with a vacuum drier at 80° C. for 10 hours, to afford 93 g of disperse-phase particles formed of spheres of sulfonated polymer (hereinafter referred to as "disperse-phase particles (16)").

By use of the particle size analyzer, the average particle diameter of the disperse-phase particles (16) was measured and found to be 5 μm.

The number of sulfonic acid groups in the sulfonated polymer forming the disperse-phase particles (16) was found by neutralization titration to be 113 based on 100 aromatic rings in the sulfonated polymer and by elemental analysis to be 111 based on 100 aromatic rings.

The water content of the disperse-phase particles (16), by use of the Karl-Fischer moisture meter, was measured and found to be 2.7 parts by weight.

An electrorheological fluid conforming to the present invention (hereinafter referred to as "fluid composition (16)") was obtained by mixing and dispersing 30 g of the disperse-phase particles (16) in 70 g of dimethyl silicone oil (produced by Shin-Etsu Chemical Co., Ltd. and marketed under trademark designation of "Shin-Etsu Silicone Oil KF96-100CS").

EXAMPLE 17

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture comprising 130 g of styrene, 60 g of methoxystyrene, 30 g of chlorostyrene, 80 g of the same industrial grade divinylbenzene as used in Example 1, and 5 g of azo-bis-isobutyronitrile was further added thereto. Then, the contents of the flask were dispersed by the use of a dispersing device (operated at a speed of 10,000 rpm) and heated for polymerization at 80° C. for 14 hours. The solid particles consequently obtained were separated by filtration, washed thoroughly with water, and then dried with a hot air drier at 80° C. for 12 hours, to afford 287 g of spheres of cross-linked polymer (hereinafter referred to as "cross-linked polymer (13)").

In a four-necked separable flask having an inner volume of 2 liters and provided with a stirrer, a thermometer and a dropping funnel, 50 g of the cross-linked polymer (13) and 250 g of nitrobenzene were placed, stirred and cooled to 0° C. with an ice bath. Then, 500 g of chlorosulfonic acid was added to the cooled mixture through the dropping funnel over a period of 2 hours, to form a dispersion. The flask was then removed from the ice bath and the contents of the flask were stirred at ambient temperature (20° C.) for 24 hours. The resultant reaction mixture was heated to 100° C. and then heated and stirred for sulfonation at the same temperature for 2 hours. The reaction mixture then was poured into water at 0° C. and solid particles were separated by filtration and washed with water and acetone.

The solid particles consequently obtained were neutralized with 45 g of pyridine and then washed thoroughly with water. Then, they were dried with a vacuum drier at 80° C. for 10 hours, to afford 128 g of disperse-phase particles formed of spheres of sulfonated polymer (hereinafter referred to as disperse-phase particles (17)").

By use of the particle size analyzer, the average particle diameter of the disperse-phase particles (17) was measured and found to be 6 μm.

The number of sulfonic acid groups in the sulfonated polymer forming the disperse-phase particles (17) was found by neutralization titration to be 125 based on 100 aromatic rings in the sulfonated polymer and by elemental analysis to be 129 based on 100 aromatic rings.

The water content of the disperse-phase particles (17), by use of the Karl-Fischer moisture meter, was measured and found to be 2.6 parts by weight.

An electrorheological fluid conforming to the present invention (hereinafter referred to as "liquid composition (17)") was obtained by mixing and dispersing 30 g of the disperse-phase particles (17) in 70 g of partially halogenated triphenyl (produced by Nippon Steel Chemical Co., Ltd. and marketed under trademark designation of "Therm-S 900").

EXAMPLE 18

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was dissolved in the water, and a mixture comprising 240 g of styrene, 60 g of the same industrial grade divinylbenzene as used in Example 1, and 4 g of azo-bis-isobutyronitrile was added to the resultant solution. Thereafter, the contents of the flask were dispersed by stirring at a speed of 600 rpm and heated for polymerization at 80° C. for 8 hours. The solid particles consequently produced in the flask were separated by filtration, thoroughly washed with water, and dried with a hot air drier at 80° C. for 12 hours, to afford 285 g of spheres of cross-linked polymer (hereinafter referred to as "cross-linked polymer (14)").

In a four-necked separable flask having an inner volume of 2 liters and provided with a stirrer, and a thermometer, 350 g of 30 wt % fuming sulfuric acid and 200 g of tetrachloroethane were stirred and cooled to 0° C. with an ice bath under stirring. Then, 50 g of the cross-linked polymer (14) was added over a period of 1 hour to give a dispersion. Then, the flask was removed from the ice bath and the contents of the flask were stirred at ambient temperature (20° C.) for 24 hours, heated to 80° C. and heated and stirred at the same temperature for 3 hours for sulfonation. After the reaction mixture in the flask was poured into water at 0° C., solid particles obtained were separated by filtration and then washed with water and acetone.

The solid particles consequently obtained were neutralized with 200 ml of an aqueous 10 wt % sodium hydroxide solution and thoroughly washed with water. Then, they were dried with a vacuum drier at 80° C. for 10 hours, to give 95 g of disperse-phase particles formed of spheres of sulfonated polymer (hereinafter referred to as "dispersed-phase particles (18)").

By use of the particle size analyzer, the average particle diameter of the disperse-phase particles (18) was measured and found to be 50 μm.

The number of sulfonic acid groups in the sulfonated polymer forming the disperse-phase particles (18) was found by neutralization titration to be 107 based on 100 aromatic rings in the sulfonated polymer and by elemental analysis to be 108 based on 100 aromatic rings.

By use of the Karl Fischer moisture meter, the water content of the disperse-phase particles (18) was measured and found to be 2.4 parts by weight.

An electrorheological fluid conforming to the present invention (hereinafter referred to as "fluid composition (18)") was obtained by stirring and dispersing 30 g of the disperse-phase particles (18) in 70 g of partially hydrogenated triphenyl (produced by Nippon Steel Chemical Co., Ltd. and marketed under trademark designation of "Therm-S 900").

EXAMPLE 19

In a four-necked separable flask having an inner volume of 2 liters and provided with a stirrer and a thermometer, 500 g of 30 wt % fuming sulfuric acid was placed and cooled to 0° C. with an ice bath under stirring. Then the cross-linked polymer (14) obtained in Example 18 was added thereto over a period of 1 hour, to give a dispersion. Then, the flask was removed from the ice bath and the contents of the flask were stirred at ambient temperature (20° C.) for 12 hours, heated to 80° C., and heated and stirred at the same temperature for 6 hours for sulfonation of the polymer. After the reaction mixture was poured into water at 0° C., solid particles obtained were separated by filtration and washed with water.

The solid particles consequently obtained were neutralized with 340 ml of an aqueous 10 wt % potassium hydroxide solution and thoroughly washed with water. Then, they were dried with a vacuum drier at 80° C. for 10 hours, to afford 116 g of disperse-phase particles formed of spheres of sulfonated polymer (hereinafter referred to as "disperse-phase particles (19)").

By use of the particle size analyzer, the average particle diameter of the disperse-phase particles (19) was measured and found to be 50 μm.

The number of sulfonic acid groups in the sulfonated polymer forming the disperse-phase particles (19) was found by neutralization titration to be 135 based on 100 aromatic rings in the sulfonated polymer and by elemental analysis to be 133 based on 100 aromatic rings.

The water content of the disperse-phase particles (19), by use of the Karl-Fischer moisture meter, was measured and found to be 2.6 parts by weight.

An electrorheological fluid conforming to the present invention (hereinafter referred to as "fluid composition (19)") was obtained by stirring and dispersing 30 g of the disperse-phase particles (19) in 70 g of dimethyl silicon oil (produced by Shin-Etsu Chemical Co., Ltd. and marketed under trademark designation of "Shin-Etsu Silicon Oil KF 96-20CS").

EXAMPLE 20

In a four-necked separable flask having an inner volume of 3 liters and provided with a stirrer, a reflux condenser, and a thermometer, 1.2 liters of water was placed, 16.0 g of polyvinyl alcohol (produced by Kuraray Co., Ltd. and marketed under trademark designation of "Kuraray Poval PVA-205") was dissolved in the water, and a mixture comprising 170 g of styrene, 90 g of chlorostyrene, 40 g of the same industrial grade divinylbenzene as used in Example 1, and 6 g of benzoyl peroxide was added to the resultant solution. Thereafter, the contents of the flask were dispersed by stirring at a speed of 400 rpm and heated at 80° C. for 9 hours for polymerization. The solid particles consequently formed were separated by filtration, washed thoroughly with water, and dried with a hot air drier at 80° C. for 12 hours, to afford 292 g of spheres of cross-linked polymer (hereinafter referred to as "cross-linked polymer (15)").

In a four-necked separable flask having an inner volume of 2 liters and provided with a stirrer and a thermometer, 300 g of 30 wt % fuming sulfuric acid and 200 g of 98 wt.% concentrated sulfuric acid were placed, stirred and cooled to 0° C. with an ice bath. Then 50 g of the cross-linked polymer (15) was added to the cooled mixture over a period of 1 hour, to form a dispersion. Then, the flask was removed from the ice bath and the contents of the flask were stirred at ambient temperature (20° C.) for 15 hours, heated to 90° C., and heated and stirred at the same temperature for 2 hours for sulfonation of the polymer. After the reaction mixture was poured into water at 0° C., solid particles obtained were separated by filtration and washed with water and acetone.

The solid particles consequently obtained were neutralized with 110 ml of an aqueous 10 wt % lithium hydroxide solution and then washed thoroughly with water. The washed solid particles were dried with a vacuum drier at 80° C. for 10 hours, to afford 83 g of disperse-phase particles formed of spheres of sulfonated polymer (hereinafter referred to as "disperse-phase particles (20)").

By use of the particle size analyzer, the average particle diameter of the disperse-phase particles (20) was measured and found to be 65 μm.

The number of sulfonic acid groups in the sulfonated polymer forming the disperse-phase particles (20) was found by neutralization titration to be 109 based on 100 aromatic rings in the sulfonated polymer and by elemental analysis to be 107 based on 100 aromatic rings.

The water content of the disperse-phase particles (20), by use of the Karl-Fischer moisture meter, was measured and found to be 2.9 parts by weight.

An electrorheological fluid conforming to the present invention (hereinafter referred to as "fluid composition (20)") was obtained by stirring and dispersing 30 g of the disperse-phase particles (20) in 70 g of bromobenzene.

EXAMPLE 21

In a four-necked separable flask having an inner volume of 3 liters and provided with a stirrer, a reflux condenser, and a thermometer, 1.2 liters of water was placed, 16.0 g of polyvinyl alcohol (produced by Kuraray Co., Ltd. and marketed under trademark designation of "Kuraray Poval PVA-205") was dissolved in the water, and a mixture comprising 130 g of styrene, 140 g of methoxystyrene, 30 g of the same industrial grade divinylbenzene as used in Example 1, and 6 g of azo-bis-isobutyronitrile was added to the resultant solution. Thereafter, the contents of the flask were dispersed by using a dispersing device (rotation speed: 5000 rpm) and heated for polymerization at 80° C. for 12 hours. The solid particles consequently produced in the flask were separated by filtration, thoroughly washed with water, and dried with a hot air drier at 80° C. for 12 hours, to afford 290 g of spheres of cross-linked polymer (hereinafter referred to as "cross-linked polymer (16)").

In a four-necked separable flask having an inner volume of 2 liters and provided with a stirrer and a thermometer, 400 g of 30 wt % fuming sulfuric acid and 400 g of dichloroethane were stirred and, at the same time, cooled to 0° C. with an ice bath. Then, 50 g of the cross-linked polymer (16) was added to the stirred mixture over a period of 1 hour to give a dispersion. Then, the flask was removed from the ice bath and the contents of the flask were stirred at ambient temperature (20° C.) for 6 hours, heated to 80° C., and heated and stirred at the same temperature for 7 hours for sulfonation. After the reaction mixture in the flask was poured into water at 0° C., solid particles were separated by filtration and then washed with water and acetone.

The solid particles consequently obtained were neutralized with 260 ml of an aqueous 10 wt % sodium hydroxide solution and thoroughly washed with water. Then, they were dried with a vacuum drier at 80° C. for 10 hours, to give 112 g of disperse-phase particles formed of spheres of sulfonated polymer (hereinafter referred to as "dispersed-phase particles (21)").

By use of the particle size analyzer, the average particle diameter of the disperse-phase particles (21) was measured and found to be 11 μm.

The number of sulfonic acid groups in the sulfonated polymer forming the disperse-phase particles (21) was found by neutralization titration to be 159 based on 100 aromatic rings in the sulfonated polymer and by elemental analysis to be 162 based on 100 aromatic rings.

By use of the Karl-Fischer moisture meter, the water content of the disperse-phase particles (21) was measured and found to be 2.6 parts by weight.

An electrorheological fluid conforming to the present invention (hereinafter referred to as "fluid composition (21)") was obtained by stirring and dispersing 30 g of the disperse-phase particles (21) in 70 g of a mixture of biphenyl and diphenyl ether (produced by Nippon Steel Chemical Co., Ltd. and marketed under trademark designation of "Therm-S 300").

EXAMPLE 22

In a four-necked separable flask having an inner volume of 2 liters and provided with a stirrer and a thermometer, 50 g of the cross-linked polymer (16) obtained in Example 21 and 400 g of 30 wt % fuming sulfuric acid were placed and cooled to 0° C. with an ice bath under stirring. Then 100 g of chlorosulfonic acid was added thereto through the dropping funnel over a period of 2 hours, to give a dispersion. Then, the flask was removed from the ice bath and the contents of the flask were stirred at ambient temperature (20° C.) for 9 hours, heated to 90° C., and heated and stirred at the same temperature for 50 minutes for sulfonation of the polymer. After the reaction mixture was poured into water at 0° C., solid particles were separated by filtration and washed with water.

The solid particles consequently obtained were neutralized with 270 ml of an aqueous 10 wt % sodium hydroxide solution and thoroughly washed with water. Then, they were dried with a vacuum drier at 80° C. for 10 hours, to afford 113 g of disperse-phase particles formed of spheres of sulfonated polymer (hereinafter referred to as "disperse-phase particles (22)").

By use of the particle size analyzer, the average particle diameter of the disperse-phase particles (22) was measured and found to be 11 $\mu$m.

The number of sulfonic acid groups in the sulfonated polymer forming the disperse-phase particles (22) was found by neutralization titration to be 165 based on 100 aromatic rings in the sulfonated polymer and by elemental analysis to be 164 based on 100 aromatic rings.

The water content of the disperse-phase particles (22), by use of the Karl-Fischer moisture meter, was measured and found to be 2.6 parts by weight.

An electrorheological fluid conforming to the present invention (hereinafter referred to as "fluid composition (22)") was obtained by stirring and dispersing 30 g of the disperse-phase particles (22) in 70 g of 1,2,4-trichlorobenzene.

EXAMPLE 23

In a four-necked separable flask having an inner volume of 3 liters and provided with a stirrer, a reflux condenser, and a thermometer, 50 ml of water, 0.4 g of sodium lauryl sulfate and 1.0 g of dodecane were placed and emulsified the mixture by using a dispersing device. Then 50 ml of water, 0.2 g of sodium persulfate, 20 g of methylstyrene, 25 g of styrene and 15 g of the same industrial grade divinylbenzene as used in Example 1 were added to the resultant solution. Thereafter, the contents of the flask was heated at 50° C. for 8 hours to afford 160 ml of an emulsion of seed latices.

Then, in a four-necked flask having an inner volume of 3 liters and provided with a stirrer, a reflux condenser, a thermometer, and a dropping funnel, 1.2 liters of water was placed, and 160 ml of the emulsion of the seed latices and 2.8 g of sodium lauryl sulfate were placed and dispersed under stirring. Thereafter, the contents of the flask were dispersed by stirring at a speed of 250 rpm and heated at 70° C. and 2 g of sodium persulfate dissolved in 10 ml of water was added. Then a mixture comprising 100 g of styrene, 80 g of methylstyrene and 60 g of the same industrial grade divinylbenzene as used in Example 1 was dropped into the mixture for 18 hours. Then the solution was subjected to reaction at the same temperature for 5 hours and heated to 90° C. and continued the reaction for 3 hours.

The solid particles consequetly formed were separated by filtration, washed thoroughly with water, and dried with a hot air drier at 80° C. for 12 hours, to afford 266 g of spheres of cross-linked polymer (hereinafter referred to as "cross-linked polymer (17)").

In a four-necked separable flask having an inner volume of 2 liters and provided with a stirrer and a thermometer, 330 g of 30 wt % fuming sulfuric acid, 170 g of 98 wt % concentrated sulfuric acid and 200 g of dichloroethane were placed, stirred and cooled to 0° C. with an ice bath. Then 50 g of the cross-linked polymer (17) was added to the mixture over a period of 1 hour to form a dispersion. Then, the flask was removed from the ice bath and the contents of the flask were stirred at ambient temperature (20° C.) for 20 hours, heated to 90° C. and heated and stirred at the same temperature for 1 hour for sulfonation of the polymer. After the reaction mixture was poured into water at 0° C. solid particles obtained were separated by filtration and washed with water and acetone.

The solid particles consequently obtained were neutralized with 200 ml of an aqueous 10 wt % sodium hydroxide solution and then washed thoroughly with water. The washed solid particles were dried with a vacuum drier at 80° C. for 10 hours, to give 94 g of disperse-phase particles formed of spheres of sulfonated polymer (hereinafter referred to as "disperse-phase particles (23)").

By use of the particle size analyzer, the average particle diameter of the disperse-phase particles (23) was measured and found to be 5 $\mu$m.

The number of sulfonic acid groups in the sulfonated polymer forming the disperse-phase particles (23) was found by neutralization titration to be 114 based on 100 aromatic rings in the sulfonated polymer and by elemental analysis to be 116 based on 100 aromatic rings.

The water content of the disperse-phase particles (23), by use of the Karl-Fischer moisture meter, was measured and found to be 2.8 parts by weight.

An electrorheological fluid conforming to the present invention (hereinafter referred to as "fluid composition (23)") was obtained by mixing and dispersing 30 g of the disperse-phase particles (23) in 30 g of dimethyl silicone oil (produced by Shin-Etsu Chemical Co., Ltd. and marketed under trademark designation of "Shin-Etsu Silicone Oil KF96-100CS").

EXAMPLE 24

In a four-necked separable flask having an inner volume of 3 liters and provided with a stirrer, a reflux condenser, and a thermometer, 1.2 liters of water was placed, 16.0 g of polyvinyl alcohol (produced by Kuraray Co., Ltd. and marketed under trademark designation of "Kuraray Poval PVA-205") was added thereto and dissolved therein, and a mixture comprising 80 g of methoxystyrene, 160 g of styrene, 30 g of chlorostyrene, 30 g of the same industrial grade divinylbenzene as used in Example 1, and 6 g of azo-bis-isobutyronitrile was added thereto. Then, the contents of the flask were dispersed by the use of a dispersing device (operated at a speed of 10,000 rpm) and heated for polymerization at 80° C. for 14 hours. The solid particles consequently formed were separated by filtration, washed thoroughly with acetone and water, and then dried with a hot air drier at 80° C. for 12 hours, to afford 285 g of spheres of cross-linked polymer (hereinafter referred to as "cross-linked polymer (18)").

In a four-necked separable flask having an inner volume of 2 liters and provided with a stirrer and a thermometer, 350 g of 30 wt % fuming sulfuric acid, 100 g of 98 wt % of concentrated sulfuric acid and 200 g of nitrobenzene were placed, stirred and cooled to 0° C. with an ice bath. Then, 50 g of the cross-linked polymer (18) was added to the cooled mixture over a period of 1 hour to give a dispersion. The flask was removed from the ice bath and the contents of the flask were stirred at ambient temperature (20° C.) for 20 hours, heated to 90° C., and heated and stirred at the same temperature for 1 hours for sulfonation of the polymer. After the resultant reaction mixture was poured into water at 0° C., solid particles obtained were separated by filtration and washed with water and acetone.

The solid particles consequently formed were neutralized with 50 g of pyridine and washed thoroughly with water. Then, they were dried with a vacuum drier at 80° C. for 10 hours, to afford 132 g of disperse-phase particles formed of spheres of sulfonated polymer (hereinafter referred to as "disperse-phase particles (24)").

By use of the particle size analyzer, the average particle diameter of the disperse-phase particles (24) was measured and found to be 6 μm.

The number of sulfonic acid groups in the sulfonated polymer forming the disperse-phase particles (24) was found by neutralization titration to be 132 based on 100 aromatic rings in the sulfonated polymer and by elemental analysis to be 132 based on 100 aromatic rings.

The water content of the disperse-phase particles (24), by use of the Karl-Fischer moisture meter, was measured and found to be 2.6 parts by weight.

An electrorheological fluid conforming to the present invention (hereinafter referred to as "fluid composition (24)") was obtained by stirring and dispersing 30 g of the disperse-phase particles (24) in 70 g of partially hydrogenated triphenyl (produced by Nippon Steel Cemical Co., Ltd. and marketed under trademark disignation of "Therm-S 900").

EXAMPLE 25

In a four-necked separable flask having an inner volume of 2 liters and provided with a stirrer, a thermoneter, and a dropping funnel, 50 g of the cross-linked polymer (9) obtained in Example 11, and 1.0 g of silver sulfate and 500 g of 98 wt % concentrated sulfuric acid were added to give a dispersion. The reaction mixture was heated to 80° C. and heated and stirred at the same temperature for 6 hours to subject to sulfonation. The resultant reaction mixture was poured into water at 0° C. and solid particles were separated by filtration and washed with water and acetone.

The solid particles consequently obtained were neutralized with 260 ml of an aqueous 10 wt % sodium hydroxide solution and then washed thoroughly with water. Then, they were dried with a vacuum drier at 80° C. for 10 hours, to afford 114 g of disperse-phase particles formed of spheres of sulfonated polymer (hereinafter referred to as "disperse-phase particles (25)").

By use of the particle size analyzer, the average particle diameter of the disperse-phase particles (25) was measured and found to be 50 μm.

The number of sulfonic acid groups in the sulfonated polymer forming the disperse-phase particles (25) was found by neutralization titration to be 135 based on 100 aromatic rings in the sulfonated polymer and by elemental analysis to be 134 based on 100 aromatic rings.

The water content of the disperse-phase particles (26), by use of the Karl-Fischer moisture meter, was measured and found to be 2.5 parts by weight.

An electrorheological fluid conforming to the present invention (hereinafter referred to as "fluid composition (25)") was obtained by mixing and dispersing 30 g of the disperse-phase particles (26) in 70 g of dimethyl silicone oil (produced by Shin-Etsu Chemical Co., Ltd. and marketed under trademark designation of "Shin-Etsu Silicone Oil KF96-20CS").

EXAMPLE 26

In a four-necked separable flask having an inner volume of 2 liters and provided with a stirrer, a thermometer, and a dropping funnel, 50 g of the cross-linked polymer (14) obtained in Example 18 was placed and 2.0 g of cupric chloride and 500 g of 98 wt % concentrated sulfuric acid were added under stirring to give a dispersion. The resultant reaction mixture was heated to 80° C. and heated and stirred at the same temperature for 15 hours for sulfonation of the polymer. After the reaction mixture was poured into water at 0° C., solid particles obtained were separeted by filtration and washed with water and acetone.

The solid particles consequently obtained were neutralized with 200 ml of an aqueous 10 wt % sodium hydroxide solution and then washed thoroughly with water. Then, they were dried with a vacuum drier at 80° C. for 10 hours, to afford 93 g of disperse-phase particles formed of spheres of sulfonated polymer (hereinafter referred to as "disperse-phase particles (26)").

By use of the particle size analyzer, the average particle diameter of the disperse-phase particles (26) was measured and found to be 50 μm.

The number of sulfonic acid groups in the sulfonated polymer was found by neutralization titration to be 106 based on 100 aromatic rings in the sulfonated polymer and by elemental analysis to be 107 based on 100 aromatic rings.

The water content of the disperse-phase particles (26), by use of the Karl-Fischer moisture meter, was measured and found to be 2.5 parts by weight.

An electrorheological fluid conforming to the present invention (hereinafter referred to as "fluid composition (26)") was obtained by mixing and dispersing 30 g of the disperse-phase particles (26) in 70 g of a mixture of biphenyl and diphenyl ether (produced by Nippon Steel Chemical Co., Ltd. and marketed under trademark designation of "Therm-S 300").

EXAMPLE 27

In a four-necked separable flask having an inner volume of 2 liters and provided with a stirrer, a thermometer and a dropping funnel, 50 g of the cross-linked polymer (11) obtained in Example 14, and 0.1 g of silver sulfate and 500 g of 98 wt % concentrated sulfuric acid were added to give a dispersion. The reaction mixture was heated to 80° C. and heated and stirred at the same temperature for 6 hours for sulfonation of the polymer. The resultant reaction mixture was poured into water at 0° C., and solid particles obtained were separated by filtration and washed with water and acetone.

The solid particles consequently obtained were neutralized with 250 ml of an aqueous 10 wt % sodium hydroxide solution and then washed thoroughly with water. Then, they were dried with a vacuum drier at 80° C. for 10 hours, to afford 109 g of disperse-phase particles formed of spheres of sulfonated polymer (hereinafter referred to as "disperse-phase particles (27)").

By use of the particle size analyzer, the average particle diameter of the disperse-phase particles (27) was measured and found to be 12 μm.

The number of sulfonic acid groups in the sulfonated polymer forming the disperse-phase particles (27) was found by neutralization titration to be 148 based on 100 aromatic rings in the sulfonated polymer and by elemental analysis to be 150 based on 100 aromatic rings.

The water content of the disperse-phase particles (27), by use of the Karl-Fischer moisture meter, was measured and found to be 2.6 parts by weight.

An electrorheological fluid conforming to the present invention (hereinafter referred to as "fluid composition (27)") was obtained by mixing and dispersing 30 g of the disperse-phase particles (27) in 70 g of dimethyl silicone oil (produced by Shin-Etsu Chemical Co., Ltd. and marketed under trademark designation of "Shin-Etsu Silicone Oil KF96-20CS").

EXAMPLE 28

In a four-necked separable flask having an inner volume of 2 liters and provided with a stirrer, a thermometer, and a dropping funnel, 500 g of 98 wt % concentrated sulfuric acid was placed and cooled to 0° C. with an ice bath, and 100 g of phosphorus pentoxide was added under stirring over a period of 30 minutes, to form a dispersion. Then, the flask was removed from the ice bath, 50 g of the cross-linked polymer (9) obtained in Example 11, and the contents of the flask were heated to 80° C. and heated and stirred at the same temperature for 12 hours for sulfonation of the polymer. After the reaction mixture was poured into water at 0° C., solid particles obtained were separated by filtration and washed with water and acetone.

The solid particles consequently obtained were neutralized with 270 ml of an aqueous 10 wt % sodium hydroxide solution and then washed thoroughly with water. Then, they were dried with a vacuum drier at 80° C. for 10 hours, to afford 110 g of disperse-phase particles formed of spheres of sulfonated polymer (hereinafter referred to as "disperse-phase particles (28)").

By use of the particle size analyzer, the average particle diameter of the disperse-phase particles (28) was measured and found to be 50 μm.

The number of sulfonic acid groups in the sulfonated polymer was found by neutralization titration to be 143 based on 100 aromatic rings in the sulfonated polymer and by elemental analysis to be 144 based on 100 aromatic rings.

The water content of the disperse-phase particles (28), by use of the Karl-Fischer moisture meter, was measured and found to be 2.5 parts by weight.

An electrorheological fluid conforming to the present invention (hereinafter referred to as "fluid composition (28)") was obtained by mixing and dispersing 30 g of the disperse-phase particles (28) in 70 g of partially hydrogenated triphenyl (produced by Nippon Steel Chemical Co., Ltd. and marketed under trademark designation of "Therm-S 900").

EXAMPLE 29

In a four-necked separable flask having an inner volume of 2 liters and provided with a stirrer, a thermometer and a dropping funnel, 500 g of 98 wt % concentrated sulfuric acid was placed and cooled to 0° C. with an ice bath. Then, 25 g of phosphorus pentoxide was added under stirring over a period of 30 minutes, to form a dispersion. Then, the flask was removed from the ice bath and 50 g of the cross-linked polymer (11) obtained in Example 14 was placed, and then the contents of the flask were heated to 80° C. and heated and stirred at the same temperature for 12 hours for sulfonation of the polymer. After the reaction mixture was poured into water at 0° C., solid particles obtained were separated by filtration and washed with water and acetone.

The solid particles consequently obtained were neutralized with 240 ml of an aqueous 10 wt % sodium hydroxide solution and then washed thoroughly with water. Then, they were dried with a vacuum drier at 80° C. for 10 hours, to afford 109 g of disperse-phase particles formed of spheres of sulfonated polymer (hereinafter referred to as "disperse-phase particles (29)").

By use of the particle size analyzer, the average particle diameter of the disperse-phase particles (29) was measured and found to be 12 μm.

The number of sulfonic acid groups in the sulfonated polymer was found by neutralization titration to be 121 based on 100 aromatic rings in the sulfonated polymer and by elemental analysis to be 120 based on 100 aromatic rings.

The water content of the disperse-phase particles (29), by use of the Karl-Fischer moisture meter, was measured and found to be 2.6 parts by weight.

An electrorheological fluid conforming to the present invention (hereinafter referred to as "fluid composition (29)") was obtained by mixing and dispersing 30 g of the disperse-phase particles (29) in 70 g of a mixture of biphenyl and diphenyl ether (produced by Nippon Steel Chemical Co., Ltd. and marketed under trademark designation of "Therm-S 300").

REFERENTIAL EXAMPLE 1

In a four-necked separable flask having an inner volume of 5 liters and provided with a stirrer, a thermometer, and a dropping funnel, 800 g of 98 wt % concentrated sulfuric acid were placed, and the 120 g of the cross-linked polymer (9) obtained in Example 11 was added and stirred for 30 minutes to form a dispersion. Then, the contents of the flask were heated to 80° C., and heated and stirred at the same temperature for 24 hours for sulfonation of the polymer. After the reaction mixture was poured into water at 0° C., solid particles obtained were separated by filtration and washed with water and acetone. The solid particles consequently obtained were dried with a vacuum drier at 80° C. for 10 hours, to afford 170 g of spherical sulfonated polymer intermediate particles (hereinafter referred to as "sulfonated polymer intermediate (1)") after classification.

REFERENTIAL EXAMPLE 2

In a four-necked separable flask having an inner volume of 5 liters and provided with a stirrer, a thermometer and a dropping funnel, 100 g of the cross-linked polymer (9) obtained in Example 11 was placed, stirred and cooled to 0° C. with an ice bath. Then, 450 g of chlorosulfonic acid was added to the cooled mixture through the dropping funnel over a period of 2 hours to form a dispersion. Then, the flask was removed from the ice bath and the contents of the flask were stirred at ambient temperature (20° C.) for 24 hours for sulfonation of the polymer. After the reaction mixture was poured into water at 0° C., solid particles obtianed were separated by filtration and washed with water and acetone. The solid particles consequently obtained were dried with a vacuum drier at 80° C. for 10 hours, to afford 145 g of spherical sulfonated polymer intermediate particles (hereinafter referred to as "sulfonated polymer intermediate (2)") after classification.

REFERENTIAL EXAMPLE 3

In a four-necked separable flask having an inner volume of 5 liters and provided with a stirrer, a thermometer and a dropping funnel, 100 g of the cross-linked polymer (10) obtianed in Example 13 and 400 g of tetrachloroethane were placed, stirred and cooled to 0° C. with an ice bath. Then, 400 g of chlorosulfonic acid was added to the cooled mixture through the dropping funnel over a period of 2 hours, to form a dispersion. Then, the flask was removed from the ice bath and the contents of the flask were stirred at ambient temperature (20° C.) for 24 hours for sulfonation of the polymer. After the reaction mixture was poured into water at 0° C., solid particles obtained were separated by filtration and washed with water and acetone. The solid particles consequently obtained were dried with a vacuum drier at 80° C. for 10 hours, to afford 148 g of spherical sulfonated polymer intermediate particles (hereinafter referred to as "sulfonated polymer intermediate (3)") after classification.

REFERENTIAL EXAMPLE 4

In a four-necked separable flask having an inner volume of 5 liters and provided with a stirrer and a thermometer, 400 g of 30 wt % fuming sulfuric acid and 400 g of dichloroethane were placed, stirred and cooled to 0° C. with an ice bath. Then, 100 g of the cross-linked polymer (11) obtained in Example 14 was added to the cooled mixture over a period of 1 hour to form a dispersion. Then, the flask was removed from the ice bath and the contents of the flask were stirred at ambient temperature (20° C.) for 10 hours for sulfonation of the polymer. After the reaction mixture was poured into water at 0° C., solid particles obtained were separated by filtration and washed with water and acetone. The solid particles consequently obtained were dried with a vacuum drier at 80° C. for 10 hours, to afford 160 g of spherical sulfonated polymer intermediate particles (hereinafter referred to as "sulfonated polymer intermediate (4)") after classification.

REFERENTIAL EXAMPLE 5

In a four-necked separable flask having an inner volume of 5 liters and provided with a stirrer and a thermometer, 260 g of 30 wt % fuming sulfuric acid, 340 g of 98 wt % concentrated sulfuric acid and 400 g of dichloroethane were placed, stirred and cooled to 0° C. with an ice bath. Then, 100 g of the cross-linked polymer (12) obtained in Example 16 was added to the cooled mixture over a period of 1 hour to form a dispersion. Then, the flask was removed from the ice bath and the contents of the flask were stirred at ambient temperature (20° C.) for 24 hours for sulfonation of the polymer. After the reaction mixture was poured into water at 0° C., solid particles obtained were separated by filtration and washed with water and acetone.

The solid particles consequently obtained were dried with a vacuum drier at 80° C. for 10 hours, to afford 146 g of spherical sulfonated polymer intermediate particles (hereinafter referred to as "sulfonated polymer intermediate (5)") after classification.

REFERENTIAL EXAMPLE 6

In a four-necked separable flask having an inner volume of 3 liters and provided with a stirrer, a reflux condenser and a thermometer, 1.2 liters of water was placed, 16.0 g of polyvinyl alcohol (produced by Kuraray Co., Ltd. and marketed under trademark designation of "Kuraray Poval PVA-205") was dissolved in the water, and a mixture comprising 180 g of styrene, 60 g of methoxystyrene, 30 g of chlorostyrene, 40 g of the same industrial grade divinylbenzene as used in Example 1, and 5 g of azo-bis-isobutyronitrile was added to the resultant solution. Thereafter, the contents of the flask were dispersed by stirring at a speed of 10,000 rpm and heated for polymerization at 80° C. for 14 hours. The solid particles consequently produced in the flask were separated by filtration, thoroughly washed with water, and dried with a hot air drier at 80° C. for 12 hours, to afford 287 g of spheres of cross-linked polymer (hereinafter referred to as "cross-linked polymer (19)").

In a four-necked separable flask having an inner volume of 5 liters and provided with a stirrer, a thermometer and a dropping funnel, 100 g of the cross-linked polymer (19) and 500 g of nitrobenzene were stirred and cooled to 0° C. with an ice bath. Then, 400 g of chlorosulfonic acid was added to the stirred mixture through the dropping funnel over a period of 2 hours, to give a dispersion. Then, the flask was removed from the ice bath and the contents of the flask were stirred at ambient temperature (20° C.) for 24 hours for sulfonation. After the reaction mixture in the flask was poured into water at 0° C., solid particles obtained were separated by filtration and then washed with water and acetone. The solid particles consequently obtained were dried with a vacuum drier at 80° C. for 10 hours, to give 152 g of spherical sulfonated polymer intermediate particles(hereinafter referred to as "sulfonated polymer intermediate (6)") after classification.

EXAMPLE 30

In a four-necked separable flask having an inner volume of 5 liters and provided with a stirrer, a thermometer and a dropping funnel, 120 g of particles of the sulfonated polymer intermediate (1) obtained in Referential Example 1 and 480 g of tetrachloroethane were placed and cooled to 0° C. with an ice bath under stirring and 840 g of chlorosulfonic acid was added thereto through the dropping funnel over a period of 2 hours, to give a dispersion. Then, the flask was removed from the ice bath and the contents of the flask were stirred at ambient temperature (20° C.) for 24 hours for sulfonation of the polymer. After the reaction mixture was poured into water at 0° C., solid particles obtained were separated by filtration and washed with water and acetone.

The solid particles consequently obtained were neutralized with 320 ml of an aqueous 10 wt % sodium hydroxide solution and thoroughly washed with water. Then, they were dried with a vacuum drier at 80° C. for 10 hours, to afford 150 g of disperse-phase particles formed of spheres of sulfonated polymer (hereinafter referred to as "disperse-phase particles (30)").

By use of the particle size analyzer, the average particle diameter of the disperse-phase particles (30) was measured and found to be 50 μm.

The number of sulfonic acid groups in the sulfonated polymer forming the disperse-phase particles (30) was found by neutralization titration to be 107 based on 100 aromatic rings in the sulfonated polymer and by elemental analysis to be 107 based on 100 aromatic rings.

The water content of the disperse-phase particles (30), by use of the Karl-Fischer moisture meter, was measured and found to be 2.5 parts by weight.

An electrorheological fluid conforming to the present invention (hereinafter referred to as "fluid composition (30)") was obtained by stirring and dispersing 30 g of the disperse-phase particles (30) in 70 g of dimethyl silicone oil (produced by Shin-Etsu Chemical Co., Ltd. and marketed under trademark designation of "Shin-Etsu Silicon Oil KF96-20CS").

EXAMPLE 31

In a four-necked separable flask having an inner volume of 5 liters and provided with a stirrer and a thermometer, 800 g of 30 wt % fuming sulfuric acid and 400 g of dichloroethane were placed, stirred and cooled to 0° C. with an ice bath. Then, 100 g of the disperse-phase particles (30) obtained in Example 30 was added to the cooled mixture over a period of 1 hour to form a dispersion. The flask was removed from the ice bath and the contents of the flask were stirred at ambient temperature (20° C.) for 24 hours for sulfonation of the polymer. Then, the resultant reaction mixture was poured into water at 0° C., and solid particles obtained were separated by filtration and washed with water and acetone.

The solid particles consequently produced were neutralized with 240 ml of an aqueous 10 wt % sodium hydroxide solution and then washed thoroughly with water. They were then dried with a vacuum drier at 80° C. for 10 hours, to afford 103 g of disperse-phase particles formed of spheres of sulfonated polymer (hereinafter referred to as "disperse-phase particles (31)").

By use of the particle size analyzer, the average particle diameter of the disperse-phase particles (31) was measured and found to be 50 $\mu$m.

The number of sulfonic acid groups in the sulfonated polymer forming the disperse-phase particles (31) was found by neutralization titration to be 113 based on 100 aromatic rings in the sulfonated polymer and by elemental analysis to be 115 based on 100 aromatic rings.

The water content of the disperse-phase particles (31), by use of the Karl-Fischer moisture meter, was measured and found to be 2.6 parts by weight.

An electrorheological fluid conforming to the present invention (hereinafter referred to as "fluid composition (31)") was obtained by mixing and dispersing 30 g of the disperse-phase particles (31) in 70 g of dimethyl silicone oil (produced by Shin-Etsu Chemical Co., Ltd. and marketed under trademark designation of "Shin-Etsu Silicone Oil KF96-20CS").

EXAMPLE 32

In a four-necked separable flask having an inner volume of 2 liters and provided with a stirrer, a thermometer, and a dropping funnel, 50 g of the disperse-phase particles (31) obtained in Example 31 was placed, stirred and cooled to 0° C. with an ice bath. Then, 500 g of chlorosulfonic acid was added to the cooled mixture over a period of 2 hours to form a dispersion. The flask was removed from the ice bath and the contents of the flask were stirred at ambient temperature (20° C.) for 24 hours for sulfonation of the polymer. Then, the resultant reaction mixture was poured into water at 0° C, and solid particles obtained were separated by filtration and washed with water and acetone.

The solid particles consequently produced were neutralized with 120 ml of an aqueous 10 wt % sodium hydroxide solution and then washed thoroughly with water. They were then dried with a vacuum drier at 80° C. for 10 hours, to afford 51 g of disperse-phase particles formed of spheres of sulfonated polymer (hereinafter referred to as "disperse-phase particles (32)").

By use of the particle size analyzer, the average particle diameter of the disperse-phase particles (32) was measured and found to be 50 $\mu$m.

The number of sulfonic acid groups in the sulfonated polymer forming the disperse-phase particles (32) was found by neutralization titration to be 121 based on 100 aromatic rings in the sulfonated polymer and by elemental analysis to be 117 based on 100 aromatic rings.

The water content of the disperse-phase particles (32), by use of the Karl-Fischer moisture meter, was measured and found to be 2.5 parts by weight.

An electrorheological fluid conforming to the present invention (hereinafter referred to as "fluid composition (32)") was obtained by mixing and dispersing 30 g of the disperse-phase particles (32) in 70 g of dimethyl silicone oil (produced by Shin-Etsu Chemical Co., Ltd. and marketed under trademark designation of "Shin-Etsu Silicone Oil KF96-20CS").

EXAMPLE 33

In a four-necked separable flask having an inner volume of 2 liters and provided with a stirrer and a thermometer, 500 g of 30 wt % fuming sulfuric acid was placed, stirred and cooled to 0° C. with an ice bath. Then, 50 g of particles of the sulfonated polymer intermediate (2) obtained in Referential Example 2 was added to the cooled mixture over a period of 1 hour to form a dispersion. The flask was removed from the ice bath and the contents of the flask were stirred at ambient temperature (20° C.) for 24 hours for sulfonation of the polymer. After the resultant reaction mixture was poured into water at 0° C., solid particles obtained were separated by filtration and washed with water and acetone.

The solid particles consequently produced were neutralized with 85 ml of an aqueous 10 wt % lithium hydroxide solution and then washed thoroughly with water. They were then dried with a vacuum drier at 80° C. for 10 hours, to afford 58 g of disperse-phase particles formed of spheres of sulfonated polymer (hereinafter referred to as "disperse-phase particles (33)").

By use of the particle size analyzer, the average particle diameter of the disperse-phase particles (33) was measured and found to be 50 $\mu$m.

The number of sulfonic acid groups in the sulfonated polymer forming the disperse-phase particles (33) was found by neutralization titration to be 108 based on 100 aromatic rings in the sulfonated polymer and by elemental analysis to be 105 based on 100 aromatic rings.

The water content of the disperse-phase particles (33), by use of the Karl-Fischer moisture meter, was measured and found to be 2.6 parts by weight.

An electrorheological fluid conforming to the present invention (hereinafter referred to as "fluid composition (33)") was obtained by mixing and dispersing 30 g of the disperse-phase particles (33) in 70 g of dimethyl silicone oil (produced by Shin-Etsu Chemical Co., Ltd. and marketed under trademark designation of "Shin-Etsu Silicone Oil KF96-100CS").

EXAMPLE 34

In a four-necked separable flask having an inner volume of 2 liters and provided with a stirrer, a thermometer, and a dropping funnel, 50 g of particles of the sulfonated polymer intermediate (3) obtained in Referential Example 3 and 250 g of nitrobenzene were placed, stirred and cooled to 0° C. with an ice bath. Then, 300 g of chlorosulfonic acid was added to the cooled mixture through the dropping funnel over a period of 2 hours to form a dispersion. The flask was removed from the ice bath and the contents of the flask were stirred at ambient temperature (20° C.) for 24 hours for sulfonation of the polymer. After the resultant reaction mixture was poured into water at 0° C., solid particles obtained were separated by filtration and washed with water and acetone.

The solid particles consequently produced were neutralized with 200 ml of an aqueous 10 wt % potassium hydroxide solution and then washed thoroughly with water. They were then dried with a vacuum drier at 80° C. for 10 hours, to afford 70 g of disperse-phase particles formed of spheres of sulfonated polymer (hereinafter referred to as "disperse-phase particles (34)").

By use of the particle size analyzer, the average particle diameter of the disperse-phase particles (34) was measured and found to be 68 μm.

The number of sulfonic acid groups in the sulfonated polymer forming the disperse-phase particles (34) was found by neutralization titration to be 114 based on 100 aromatic rings in the sulfonated polymer and by elemental analysis to be 111 based on 100 aromatic rings.

The water content of the disperse-phase particles (34), by use of the Karl-Fischer moisture meter, was measured and found to be 2.6 parts by weight.

An electrorheological fluid conforming to the present invention (hereinafter referred to as "fluid composition (34)") was obtained by mixing and dispersing 30 g of the disperse-phase particles (34) in 70 g of partially hydrogenated triphenyl (produced by Nippon Steel Chemical Co., Ltd. and marketed under trademark designation of "Therm-S 900").

EXAMPLE 35

In a four-necked separable flask having an inner volume of 2 liters and provided with a stirrer, a thermometer and a dropping funnel, 50 g of particles of sulfonated polymer intermediate (4) obtained in Referential Example 4 were placed, stirred and cooled to 0° C. with an ice bath. Then, 700 g of chlorosulfonic acid was added to the cooled mixture through the dropping funnel over a period of 2 hours to form a dispersion. The flask was removed from the ice bath and the contents of the flask were stirred at ambient temperature (20° C.) for 24 hours for sulfonation of the polymer. After the resultant reaction mixture was poured into water at 0° C., solid particles obtained were separated by filtration and washed with water and acetone.

The solid particles consequently produced were neutralized with 24 g of pyridine and then washed thoroughly with water. They were then dried with a vacuum drier at 80° C. for 10 hours, to afford 75 g of disperse-phase particles formed of spheres of sulfonated polymer (hereinafter referred to as "disperse-phase particles (35)").

By use of the particle size analyzer, the average particle diameter of the disperse-phase particles (35) was measured and found to be 10 μm.

The number of sulfonic acid groups in the sulfonated polymer forming the disperse-phase particles (35) was found by neutralization titration to be 124 based on 100 aromatic rings in the sulfonated polymer and by elemental analysis to be 121 based on 100 aromatic rings.

The water content of the disperse-phase particles (35), by use of the Karl-Fischer moisture meter, was measured and found to be 2.5 parts by weight.

An electrorheological fluid conforming to the present invention (hereinafter referred to as "fluid composition (35)") was obtained by mixing and dispersing 30 g of the disperse-phase particles (35) in 70 g of dibromobenzene.

EXAMPLE 36

In a four-necked separable flask having an inner volume of 2 liters and provided with a stirrer and a thermometer, 50 g of particles of sulfonated polymer intermediate (5) obtained in Referential Example 5 and 200 g of dichloroethane were placed, stirred and cooled to 0° C. with an ice bath. Then, 350 g of chlorosulfonic acid was added to the cooled mixture over a period of 2 hours to form a dispersion. The flask was removed from the ice bath and the contents of the flask were stirred at ambient temperature (20° C.) for 24 hours for sulfonation of the polymer. After the resultant reaction mixture was poured into water at 0° C., solid particles obtained were separated by filtration and washed with water and acetone.

The solid particles consequently produced were neutralized with 72 ml of an aqueous 10 wt % lithium hydroxide solution and then washed thoroughly with water. They were then dried with a vacuum drier at 80° C. for 10 hours, to afford 53 g of disperse-phase particles formed of spheres of sulfonated polymer (hereinafter referred to as "disperse-phase particles (361)").

By use of the particle size analyzer, the average particle diameter of the disperse-phase particles (36) was measured and found to be 4 μm.

The number of sulfonic acid groups in the sulfonated polymer forming the disperse-phase particles (36) was found by neutralization titration to be 108 based on 100 aromatic rings in the sulfonated polymer and by elemental analysis to be 110 based on 100 aromatic rings.

The water content of the disperse-phase particles (36), by use of the Karl-Fischer moisture meter, was measured and found to be 2.1 parts by weight.

An electrorheological fluid conforming to the present invention (hereinafter referred to as "fluid composition (36)") was obtained by mixing and dispersing 30 g of the disperse-phase particles (36) in 70 g of 1,2,4-trichlorobenzene.

EXAMPLE 37

In a four-necked separable flask having an inner volume of 2 liters and provided with a stirrer and a thermometer, 250 g of 30 wt % fuming sulfuric acid and 200 g of nitrobenzene were placed, stirred and cooled to 0° C. with an ice bath. Then, 50 g of particles the sulfonated polymer intermediate (6) obtained in Referential Example 6 were added to the cooled mixture over a period of 1 hour to form a dispersion. The flask was removed from the ice bath and the contents of the flask were stirred at ambient temperature (20° C.) for 24 hours for sulfonation of the polymer. After the resultant reaction mixture was poured into water at 0° C. , sold particles obtained were separated by filtration and washed with water and acetone.

The solid particles consequently produced were neutralized with 120 ml of an aqueous 10 wt % sodium hydroxide solution and then washed thoroughly with water. They were then dried with a vacuum drier at 80° C. for 10 hours, to afford 60 g of disperse-phase particles formed of spheres of sulfonated polymer (hereinafter referred to as "disperse-phase particles (37)").

By use of the particle size analyzer, the average particle diameter of the disperse-phase particles (37) was measured and found to be 5 μm.

The number of sulfonic acid groups in the sulfonated polymer forming the disperse-phase particles (37) was found by neutralization titration to be 110 based on 100 aromatic rings in the sulfonated polymer and by elemental analysis to be 114 based on 100 aromatic rings.

The water content of the disperse-phase particles (37), by use of the Karl-Fischer moisture meter, was measured and found to be 2.6 parts by weight.

An electrorheological fluid conforming to the present invention (hereinafter referred to as "fluid composition (37)") was obtained by mixing and dispersing 30 g of the disperse-phase particles (37) in 70 g of a mixture of biphenyl and diphenyl ether (produced by Nippon Steel Chemical Co., Ltd. and marketed under trademark designation of "Therm-S 300").

CONTROL 1

In a four-necked separable flask having an inner volume of 3 liters and provided with a stirrer, a reflux condenser, and a thermometer, 1.2 liters of water was placed, 16.0 g of polyvinyl alcohol (produced by Kuraray Co., Ltd. and marketed under trademark designation of "Kuraray Poval PVA-205") was added to the water and dissolved therein, and a mixture comprising 300 g of styrene, 30 g of the same industrial grade divinylbenzene as used in Example 1, and 4 g of azo-bis-isobutyronitrile was added thereto. Thereafter, the contents of the flask were dispersed with the stirrer operated at a speed of 670 rpm, and heated for polymerization at 80° C. for 7 hours. The solid particles consequently obtained were separated by filtration, washed thoroughly with water, and dried with a hot air drier at 80° C. for 12 hours, to afford 305 g of spheres of cross-linked polymer (hereinafter referred to as "cross-linked polymer (20)").

In a four-necked separable flask having an inner volume of 2 liters and provided with a stirrer, a thermometer, and a dropping funnel, 50 g of the cross-linked polymer (20) and 250 g of tetrachloroethane were placed, stirred and cooled to 0° C. with an ice bath. Then, 250 g of chlorosulfonic acid was added to the cooled mixture through the dropping funnel over a period of 2 hours, to form a dispersion. Then, the flask was removed from the ice bath and the contents of the flask were stirred at ambient temperature (20° C.) for 5 hours. The resultant reaction mixture was heated to 70° C., and heated and stirred at the same temperature for 12 hours for sulfonation of the polymer. After the reaction mixture was poured into water at 0° C., solid particles obtained were separated by filtration and washed with water and acetone.

The solid particles consequently obtained were neutralized with 180 ml of an aqueous 10 wt % sodium hydroxide solution and then washed thoroughly with water. Then, they were dried with a vacuum drier at 80° C. for 10 hours, to afford 89 g of disperse-phase particles formed of spheres of sulfonated polymer for comparison (hereinafter referred to as "disperse-phase particles for comparison(1)").

By use of the particle size analyzer, the average particle diameter of the disperse-phase particles for comparison (1) was meausred and found to be 45 μm.

The number of sulfonic acid groups in the sulfonated polymer forming the disperse-phase particles for comparison (1) was found by neutralization titration to be 90 based on 100 aromatic rings in the sulfonated polymer and by elemental analysis to be 87 based on 100 aromatic rings.

The water content of the disperse-phase particles for comparison (1), by use of the Karl-Fischer moisture meter, was found to be 2.7 parts by weight.

An electrorheological fluid thus obtained (hereinafter referred to as "fluid composition for comparison (1)") was obtained by mixing and dispersing 30 g of the disperse-phase particles for comparison (1) in 70 g of dimethyl silicon oil (produced by Shin-Etsu Chemical Co., Ltd. and marketed under trademark designation of "Shin-Etsu Silicon Oil KF96-20CS").

CONTROL 2

In a four-necked separable flask having an inner volume of 2 liters and provided with a stirrer, a thermometer and a dropping funnel, 50 g of the cross-linked polymer (20) obtained in Control 1 and 250 g of tetrachloroethane were placed, stirred and cooled to 0° C. with an ice bath. Then, 250 g of chlorosulfonic acid was added to the cooled mixture through the dropping funnel over a period of 2 hours to form a dispersion. The flask was removed from the ice bath and the contents of the flask were stirred at ambient temperature (20° C.) for 17 hours for sulfonation of the polymer. Then, the resultant reaction mixture was poured into water at 0° C. and solid particles obtained were separated by filtration and washed with water and acetone.

The solid particles consequently produced were neutralized with 150 ml of an aqueous 10 wt % sodium hydroxide solution and then washed thoroughly with water. They were then dried with a vacuum drier at 80° C. for 10 hours, to afford 81 g of disperse-phase particles formed of spheres of sulfonated polymer for comparison (hereinafter referred to as "disperse-phase particles for comparison (2)").

By use of the particle size analyzer, the average particle diameter of the disperse-phase particles for comparison (2) was measured and found to be 45 μm.

The number of sulfonic acid groups in the sulfonated polymer forming the disperse-phase particles for comparison (2) was found by neutralization titration to be 96 based on 100 aromatic rings in the sulfonated polymer and by elemental analysis to be 94 based on 100 aromatic rings.

The water content of the disperse-phase particles for comparison (2), by use of the Karl-Fischer moisture meter, was measured and found to be 3.0 parts by weight.

An electrorheological fluid thus obtained (hereinafter referred to as "fluid composition for comparison (2)") was obtained by mixing and dispersing 30 g of the disperse-phase particles for comparison (2) in 70 g of dimethyl silicone oil (produced by Shin-Etsu Chemical Co., Ltd. and marketed under trademark designation of "Shin-Etsu Silicone Oil KF96-20CS").

CONTROL 3

In a four-necked separable flask having an inner volume of 2 liters and provided with a stirrer, a thermometer, and a dropping funnel, 50 g of the cross-linked polymer (9) obtained in Example 11 and 200 g of tetrachloroethane were placed, stirred and cooled to 0° C. with an ice bath. Then, 350 g of 98 wt % concentrated sulfuric acid was added to the cooled mixture through the dropping funnel over a period of 2 hours to form a dispersion. The flask was removed from the ice bath and the contents of the flask were stirred at ambient temperature (20° C.) for 24 hours, then heated to 80° C. and heated and stirred at the same temperature for 2 hours for sulfonation of the polymer. Then, the resultant reaction mixture was poured into water at 0° C., and solid particles obtained were separated by filtration and washed with water and acetone.

The solid particles consequently produced were neutralized with 80 ml of an aqueous 10 wt % sodium hydroxide solution and then washed thoroughly with water. They were then dried with a vacuum drier at 80° C. for 10 hours, to afford 63 g of disperse-phase particles formed of spheres of sulfonated polymer for comparison (hereinafter referred to as "disperse-phase particles for comparison (3)").

By use of the particle size analyzer, the average particle diameter of the disperse-phase particles for comparison (3) was measured and found to be 50 $\mu$m.

The number of sulfonic acid groups in the sulfonated polymer forming the disperse-phase particles for comparison (3) was found by neutralization titration to be 40 based on 100 aromatic rings in the sulfonated polymer and by elemental analysis to be 41 based on 100 aromatic rings.

The water content of the disperse-phase particles for comparison (3), by use of the Karl-Fischer moisture meter, was measured and found to be 2.7 parts by weight.

An electrorheological fluid thus obtained (hereinafter referred to as "fluid composition for comparison (3)") was obtained by mixing and dispersing 30 g of the disperse-phase particles for comparison (3) in 70 g of dimethyl silicone oil (produced by Shin-Etsu Chemical Co., Ltd. and marketed under trademark designation of "Shin-Etsu Silicone Oil KF96-20CS").

CONTROL 4

In a four-necked separable flask having an inner volume of 2 liters and provided with a stirrer, a thermometer, and a dropping funnel, 50 g of the cross-linked polymer (9) obtained in Example 11 and 200 g of tetrachloroethane were placed, stirred and cooled to 0° C. with an ice bath. Then, 350 g of 98 wt % concentrated sulfuric acid was added to the cooled mixture through the dropping funnel over a period of 2 hours to form a dispersion. The flask was removed from the ice bath and the contents of the flask were stirred at ambient temperature (20° C.) for 24 hours, then heated to 80° C., and heated and stirred at the same temperature for 24 hours for sulfonation of the polymer. After, the resultant reaction mixture was poured into water at 0° C., solid particles obtained were separated by filtration and washed with water and acetone.

The solid particles consequently produced were neutralized with 170 ml of an aqueous 10 wt % sodium hydroxide solution and then washed thoroughly with water. They were then dried with a vacuum drier at 80° C. for 10 hours, to afford 87 g of disperse-phase particles formed of spheres of sulfonated polymer for comparison (hereinafter referred to as "disperse-phase particles for comparison (4)").

By use of the particle size analyzer, the average particle diameter of the disperse-phase particles for comparison (4) was measured and found to be 50 $\mu$m.

The number of sulfonic acid groups in the sulfonated polymer forming the disperse-phase particles for comparison (4) was found by neutralization titration to be 92 based on 100 aromatic rings in the sulfonated polymer and by elemental analysis to be 90 based on 100 aromatic rings.

The water content of the disperse-phase particles for comparison (4), by use of the Karl-Fischer moisture meter, was measured and found to be 2.8 parts by weight.

An electrorheological fluid thus obtained (hereinafter referred to as "fluid composition for comparison (4)") was obtained by mixing and dispersing 30 g of the disperse-phase particles for comparison (4) in 70 g of dimethyl silicone oil (produced by Shin-Etsu Chemical Co., Ltd. and marketed under trademark designation of "Shin-Etsu Silicone Oil KF96-20CS").

CONTROL 5

In a four-necked separable flask having an inner volume of 2 liters and provided with a stirrer, a thermometer, and a dropping funnel, 50 g of the cross-linked polymer (9) obtained in Example 11 and 350 g of tetrachloroethane were placed, stirred and cooled to 0° C. with an ice bath. Then, 240 g of chlorosulfonic acid was added to the cooled mixture through the dropping funnel over a period of 2 hours to form a dispersion. The flask was removed from the ice bath and the contents of the flask were stirred at ambient temperature (20° C.) for 24 hours, then heated to 80° C. and heated and stirred at the same temperature for 2 hours for sulfonation of the polymer. After the resultant reaction mixture was poured into water at 0° C., solid particles obtained were separated by filtration and washed with water and acetone.

The solid particles consequently produced were neutralized with 170 ml of an aqueous 10 wt % sodium hydroxide solution and then washed thoroughly with water. They were then dried with a vacuum drier at 80° C. for 10 hours, to afford 88 g of disperse-phase particles formed of spheres of sulfonated polymer for comparison (hereinafter referred to as "disperse-phase particles for comparison (5)").

By use of the particle size analyzer, the average particle diameter of the disperse-phase particles for comparison (5) was measured and found to be 50 $\mu$m.

The number of sulfonic acid groups in the sulfonated polymer forming the disperse-phase particles for comparison (5) was found by neutralization titration to be 95 based on 100 aromatic rings in the sulfonated polymer and by elemental analysis to be 94 based on 100 aromatic rings.

The water content of the disperse-phase particles for comparison (5), by use of the Karl-Fischer moisture meter, was measured found to be 2.6 parts by weight.

An electrorheological fluid thus obtained (hereinafter referred to as "fluid composition for composition (5)") was obtained by mixing and dispersing 30 g of the disperse-phase particles for comparison (5) in 70 g of dimethyl silicone oil (produced by Shin-Etsu Chemical Co., Ltd. and marketed under trademark designation of "Shin-Etsu Silicone Oil KF96-20CS").

CONTROL 6

In a four-necked separable flask having an inner volume of 2 liters and provided with a stirrer and a thermometer, 350 g of 98 wt % concentrated sulfuric acid and 200 g of tetrachloroethane were placed, stirred and cooled to 0° C. with an ice bath. Then, 50 g of the cross-linked polymer (14) obtained in Example 18 was added to the cooled mixture over a period of 1 hour to form a dispersion. The flask was removed from the ice bath and the contents of the flask were stirred at ambient temperature (20° C.) for 24 hours, then heated to 80° C., and heated and stirred at the same temperature for 3 hours for sulfonation of the polymer. After the resultant reaction mixture was poured into water at 0° C., solid particles obtained were separated by filtration and washed with water and acetone.

The solid particles consequently produced were neutralized with 100 ml of an aqueous 10 wt % sodium hydroxide solution and then washed thoroughly with water. They were then dried with a vacuum drier at 80° C. for 10 hours, to afford 68 g of disperse-phase particles formed of spheres of sulfonated polymer for comparison (hereinafter referred to as "disperse-phase particles for comparison (6)").

By use of the particle size analyzer, the average particle diameter of the disperse-phase particles for comparison (6) was measured and found to be 50 μm.

The number of sulfonic acid groups in the sulfonated polymer forming the disperse-phase particles for comparison (6) was found by neutralization titration to be 50 based on 100 aromatic rings in the sulfonated polymer and by elemental analysis to be 48 based on 100 aromatic rings.

The water content of the disperse-phase particles for comparison (6), by use of the Karl-Fischer moisture meter, was measured and found to be 1.0 part by weight.

An electrorheological fluid thus obtained (hereinafter referred to as "fluid composition for comparison (6)") was obtained by mixing and dispersing 30 g of the disperse-phase particles for comparison (6) in 70 g of partially hydrogenated triphenyl (produced by Nippon Steel Chemical Co., Ltd. and marketed under trademark designation of "Therm-S 900").

CONTROL 7

In a four-necked separable flask having an inner volume of 2 liters and provided with a stirrer and a thermometer, 350 g of 98 wt % concentrated sulfuric acid and 200 g of tetrachloroethane were placed, stirred and cooled to 0° C. with an ice bath. Then, 50 g of the cross-linked polymer (14) obtained in Example 18 was added to the cooled mixture over a period of 1 hour to form a dispersion. The flask was removed from the ice bath and the contents of the flask were stirred at ambient temperature (20° C.) for 24 hours, then heated to 80° C., and heated and stirred at the same temperature for 24 hours for sulfonation of the polymer. After the resultant reaction mixture was poured into water at 0° C., solid particles obtained were separated by filtration and washed with water and acetone.

The solid particles consequently produced were neutralized with 170 ml of an aqueous 10 wt % sodium hydroxide solution and then washed thoroughly with water. They were then dried with a vacuum drier at 80° C. for 10 hours, to afford 88 g of disperse-phase particles formed of spheres of sulfonated polymer for comparison (hereinafter referred to as "disperse-phase particles for comparison (7)").

By use of the particle size analyzer, the average particle diameter of the disperse-phase particles for comparison (7) was measured and found to be 50 μm.

The number of sulfonic acid groups in the sulfonated polymer forming the disperse-phase particles for comaprison (7) was found by neutralization titration to be 91 based on 100 aromatic rings in the sulfonated polymer and by elemental analysis to be 92 based on 100 aromatic rings.

The water content of the disperse-phase particles for comparison (7), by use of the Karl-Fischer moisture meter, was measured and found to be 2.9 parts by weight.

An electrorheological fluid thus obtained (hereinafter referred to as "fluid composition for comparison (7)") was obtained by mixing and dispersing 30 g of the disperse-phase particles for comparison (7) in 70 g of partially hydrogenated triphenyl(produced by Nippon Steel Chemical Co., Ltd. and marketed under trademark designation of "Therm-S 900").

CONTROL 8

In a four-necked separable flask having an inner volume of 2 liters and provided with a stirrer and a thermometer, 220 g of 30 wt % fuming sulfuric acid and 330 g of tetrachloroethane were placed and stirred and cooled to 0° C. with an ice bath. Then, 50 g of the cross-linked polymer (14) obtained in Example 18 was added to the cooled mixture over a period of 1 hour to form a dispersion. The flask was removed from the ice bath and the contents of the flask were stirred at ambient temperature (20° C.) for 24 hours, then heated to 80° C., and heated and stirred at the same temperature for 3 hours for sulfonation of the polymer. After the resultant reaction mixture was poured into water at 0° C. solid particles obtained were separated by filtration and washed with water and acetone.

The solid particles consequently produced were neutralized with 170 ml of an aqueous 10 wt % sodium hydroxide solution and then washed thoroughly with water. They were then dried with a vacuum drier at 80° C. for 10 hours, to afford 87 g of disperse-phase particles formed of spheres of sulfonated polymer for comparison (hereinafter referred to as "disperse-phase particles for comparison (8)").

By use of the particle size analyzer, the average particle diameter of the disperse-phase particles for comparison (8) was measured and found to be 50 μm.

The number of sulfonic acid groups in the sulfonated polymer forming the disperse-phase particles for comparison (8) was found by neutralization titration to be 95 based on 100 aromatic rings in the sulfonated polymer and by elemental analysis to be 93 based on 100 aromatic rings.

The water content of the disperse-phase particles for comaprison (8), by use of the Karl-Fischer moisture meter, was measured and found to be 2.6 parts by weight.

An electrorheological fluid thus obtained (hereinafter referred to as "fluid composition for comparison (8)") was obtained by mixing and dispersing 30 g of the disperse-phase particles for comparison (8) in 70 g of partially hydrogenated triphenyl (produced by Nippon Steel Chemical Co., Ltd. and marketed under trademark designation of "Therm-S 900").

CONTROL 9

50 g of the particles of the sulfonated polymer intermediate (1) obtained in Referential Example 1 was neutralized with 120 ml of an aqueous 10 wt % sodium hydroxide solution and then washed thoroughly with water. They were then dried with a vacuum drier at 80° C. for 10 hours, to afford 54 g of disperse-phase particles formed of spheres of sulfonated polymer for comparison (hereinafter referred to as "disperse-phase particles for comparison (9)").

By use of the particle size analyzer, the average particle diameter of the disperse-phase particles for comparison (9) was measured and found to be 50 μm.

The number of sulfonic acid groups in the sulfonated polymer forming the disperse-phase particles for comparison (9) was found by neutralization titration to be 83 based on 100 aromatic rings in the sulfonated polymer and by elemental analysis to be 87 based on 100 aromatic rings.

The water content of the disperse-phase particles for comparison (9), by use of the Karl-Fischer moisture meter, was measured and found to be 2.5 parts by weight.

An electrorheological fluid thus obtained (hereinafter referred to as "fluid composition for comparison (9)") was obtained by mixing and dispersing 30 g of the disperse-phase particles for comparison (9) in 70 g of dimethyl silicone oil (produced by Shin-Etsu Chemical Co., Ltd. and marketed under trademark designation of "Shin-Etsu Silicone Oil KF96-20CS").

CONTROL 10

50 g of the particles of the sulfonated polymer intermediate (2) obtained in Referential Example 2 was neutralized with 70 ml of an aqueous 10 wt % lithium hydroxide solution and then washed thoroughly with water. They were then dried with a vacuum drier at 80° C. for 10 hours, to afford 51 g of disperse-phase particles formed of spheres of sulfonated polymer for comparison (hereinafter referred to as "disperse-phase particles for comparison (10)").

By use of the particle size analyzer, the average particle diameter of the disperse-phase particles for comparison (10) was measured and found to be 50 μm.

The number of sulfonic acid groups in the sulfonated polymer forming the disperse-phase particles for comparison (10) was found by neutralization titration to be 80 based on 100 aromatic rings in the sulfonated polymer and by elemental analysis to be 77 based on 100 aromatic rings.

The water content of the disperse-phase particles for domparison (10), by use of the Karl-Fischer moisture meter, was measured and found to be 2.4 parts by weight.

An electrorheological fluid thus obtained (hereinafter referred to as "fluid composition for comparison (10)") was obtained by mixing and dispersing 30 g of the disperse-phase particles for comparison (10) in 70 g of dimethyl silicone oil (produced by Shin-Etsu Chemical Co., Ltd. and marketed under trademark designation of "Shin-Etsu Silicone Oil KF96-100CS").

CONTROL 11

50 g of the particles of the sulfonated polymer intermediate (3) obtained in Referential Example 3 was neutralized with 150 ml of an aqueous 10 wt % potassium hydroxide solution and then washed thoroughly with water. They were then dried with a vacuum drier at 80° C. for 10 hours, to afford 55 g of disperse-phase particles formed of spheres of sulfonated polymer for comparison (hereinafter referred to as "disperse-phase particles for comparison (11)").

By use of the particle size analyzer, the average particle diameter of the disperse-phase particles for comparison (11) was measured and found to be 68 μm.

The number of sulfonic acid groups in the sulfonated polymer forming the disperse-phase particles for comparison (11) was found by neutralization titration to be 87 based on 100 aromatic rings in the sulfonated polymer and by elemental analysis to be 84 based on 100 aromatic rings.

The water content of the disperse-phase particles for comparison (11), by use of the Karl-Fischer moisture meter, was measured and found to be 2.8 parts by weight.

An electrorheological fluid thus obtained (hereinafter referred to as "fluid composition for comparison (11)") was obtained by mixing and dispersing 30 g of the disperse-phase particles for comparison (11) in 70 g of partially hydrogenated triphenyl (produced by Nippon Steel Chemical Co., Ltd. and marketed under trademark designation of "Therm-S 900").

CONTROL 12

50 g of the particles of the sulfonated polymer intermediate (4) obtained in Referential Example 4 was neutralized with 24 g of pyridine and then washed thoroughly with water. They were then dried with a vacuum drier at 80° C. for 10 hours, to afford 63 g of disperse-phase particles formed of spheres of sulfonated polymer for comparison (hereinafter referred to as "disperse-phase particles for comparison (12)").

By use of the particle size analyzer, the average particle diameter of the disperse-phase particles for comparison (12) was measured and found to be 10 μm.

The number of sulfonic acid groups in the sulfonated polymer forming the disperse-phase particles for comparison (12) was found by neutralization titration to be 90 based on 100 aromatic rings in the sulfonated polymer and by elemental analysis to be 94 based on 100 aromatic rings.

The water content of the disperse-phase particles for comparison (12), by use of the Karl-Fischer moisture meter, was measured found to be 2.6 parts by weight.

An electrorheological fluid thus obtained (hereinafter referred to as "fluid composition for comparison (12)") was obtained by mixing and dispersing 30 g of the disperse-phase particles for comparison (12) in 70 g of bromobenzene.

CONTROL 13

50 g of the particles of the sulfonated polymer intermediate (5) obtained in Referential Example 5 was neutralized with 80 ml of an aqueous 10 wt % lithium hydroxide solution and then washed thoroghly with water. They were then dried with a vacuum .drier at 80° C. for 10 hours, to afford 50 g of disperse-phase particles formed of spheres of sulfonated polymer for comparison (hereinafter referred to as "disperse-phase particles for comparison (13)").

By use of the particle size analyzer, the average particle diameter of the disperse-phase particles for comparison (13) was measured and found to be 4 μm.

The number of sulfonic acid groups in the sulfonated polymer forming the disperse-phase particles for comparison (13) was found by neutralization titration to be 93 based on 100 aromatic rings in the sulfonated polymer and by elemental analysis to be 92 based on 100 aromatic rings.

The water content of the disperse-phase particles for comparison (13), by use of the Karl-Fischer moisture meter, was measured and found to be 2.7 parts by weight.

An electrorheological fluid thus obtained (hereinafter referred to as "fluid composition for comparison (13)") was obtained by mixing and dispersing 30 g of the disperse-phase particles for comparison (13) in 70 g of 1,2,4-trichlorobezene.

CONTROL 14

50 g of the particles of the sulfonated polymer intermediate (6) obtained in Referential Example 6 was neutralized with 120 ml of an aqueous 10 wt % sodium hydroxide solution and then washed thoroghly with water. They were then dried with a vacuum drier at 80° C. for 10 hours, to afford 52 g of disperse-phase particles formed of spheres of sulfonated polymer for comparison (hereinafter referred to as "disperse-phase particles for comparison (14)").

By use of the particle size analyzer, the average particle diameter of the disperse-phase particles for comparison (14) was measured and found to be 5 μm.

The number of sulfonic acid groups in the sulfonated polymer forming the disperse-phase particles for comparison (14) was found by neutralization titration to be 90 based on 100 aromatic rings in the sulfonated polymer and by elemental analysis to be 91 based on 100 aromatic rings.

The water content of the disperse-phase particles for comparison (14), by use of the Karl-Fischer moisture meter, was measured and found to be 2.5 parts by weight.

An electrorheological fluid thus obtained (hereinafter referred to as "fluid composition for comparison (14)") was obtained by mixing and dispersing 30 g of the disperse-phase particles for comparison (14) in 70 g of a mixture of biphenyl and diphenyl ether (produced by Nippon Steel Chemical Co., Ltd. and marketed under trademark designation of "Therm-S 300").

EXAMPLE 38

In order to measure the electrorheological properties of the electrorheological fluid compositions produced according to this invention in the presence of an electric field, a rotary viscometer was modified to facilitate the application of an electric field and was found to be a quick and reliable way of measuring the electrorheological properties. The fluid option assembly (cup and bob) of the rotary viscometer was modified to facilitate the application of an AC external electric field across an 1 mm gap between the cup and bob.

Each of the fluid compositions (1) to (37) obtained in Example 1 to 37, respectively, and the fluid compositions for comparison (1) to (14) obtained in Control 1 to 14, respectively, was placed between two coaxial cylinders (the cup and bob) of the viscometer. Then, shear stress (initial value) and current density (initial value) generated in response to an application of an AC electric field of 4,000 V/mm (frequency: 60 Hz) were measured under the conditions of 400 $S^{-1}$ in shear rate and 25° C. in temperature.

Each of the fluid compositions was left standing for 7 days under the application of the AC electric field of 4000 V/mm with the viscometer continuously operated at 25° C. At the end of the standing, shear stress (value after 7 days' standing) and current density (value after 7 days' standing) were measured in order to examine the stability of the fluid compositions to withstand the effect of aging.

The results are shown in Table 1.

TABLE 1

| Electrorheological fluid composition to be evaluated | Disperse-phase particles contained in electrorheological composition | Average particle-size of disperse phase particles (μm) | Shear stress (g/cm²) Initial | Shear stress (g/cm²) After 7 days | Current density (μA/cm²) Initial | Current density (μA/cm²) After 7 days | Z value (g/μA) Initial | Z value (g/μA) After 7 days |
|---|---|---|---|---|---|---|---|---|
| Fluid composition (1) | Disperse-phase particles (1) | 45 | 63 | 61 | 18 | 19 | 3.5 | 3.2 |
| Fluid composition (2) | Disperse-phase particles (2) | 45 | 65 | 64 | 19 | 21 | 3.4 | 3.0 |
| Fluid composition for comparison (1) | Disperse phase particles for comparison (1) | 45 | 49 | Measurement impossible** | 71 | Measurement impossible** | 0.7 | — |
| Fluid composition for comparison (2) | Disperse phase particles for comparison (2) | 45 | 42 | 38 | 48 | 60 | 0.9 | 0.6 |
| Fluid composition (3) | Disperse-phase particles (3) | 55 | 60 | 59 | 28 | 30 | 2.1 | 2.0 |
| Fluid composition (4) | Disperse-phase particles (4) | 55 | 51 | 48 | 34 | 35 | 1.5 | 1.4 |
| Fluid composition (5) | Disperse-phase particles (5) | 10 | 36 | 34 | 27 | 29 | 1.3 | 1.2 |
| Fluid composition (6) | Disperse-phase particles (6) | 5 | 34 | 35 | 30 | 32 | 1.1 | 1.1 |
| Fluid composition (7) | Disperse-phase particles (7) | 75 | 51 | 51 | 22 | 25 | 2.3 | 2.0 |
| Fluid composition (8) | Disperse-phase particles (8) | 40 | 53 | 52 | 23 | 24 | 2.3 | 2.2 |
| Fluid composition (9) | Disperse-phase particles (9) | 5 | 37 | 36 | 29 | 29 | 1.3 | 1.2 |
| Fluid composition (10) | Disperse-phase particles (10) | 8 | 42 | 42 | 28 | 30 | 1.5 | 1.4 |
| Fluid composition (11) | Disperse-phase particles (11) | 50 | 61 | 60 | 19 | 20 | 3.2 | 3.0 |

TABLE 1-continued

| Electrorheological fluid composition to be evaluated | Disperse-phase particles contained in electrorheological composition | Average particle-size of disperse phase particles (μm) | Shear stress (g/cm²) Initial | Shear stress (g/cm²) After 7 days | Current density (μA/cm²) Initial | Current density (μA/cm²) After 7 days | Z value (g/μA) Initial | Z value (g/μA) After 7 days |
|---|---|---|---|---|---|---|---|---|
| Fluid composition (12) | Disperse-phase particles (12) | 50 | 68 | 69 | 20 | 21 | 3.4 | 3.3 |
| Fluid composition for comparison (3) | Disperse-phase particles for comparison (3) | 50 | 26 | Measurement impossible* | 41 | Measurement impossible* | 0.6 | — |
| Fluid composition for comparison (4) | Disperse-phase particles for comparison (4) | 50 | 48 | Measurement impossible** | 72 | Measurement impossible** | 0.7 | — |
| Fluid composition for comparison (5) | Disperse-phase particles for comparison (5) | 50 | 49 | Measurement impossible** | 70 | Measurement impossible** | 0.7 | — |
| Fluid composition (13) | Disperse-phase particles (13) | 66 | 67 | 67 | 22 | 23 | 3.0 | 2.9 |
| Fluid composition (14) | Disperse-phase particles (14) | 12 | 41 | 40 | 20 | 19 | 2.1 | 2.1 |
| Fluid composition (15) | Disperse-phase particles (15) | 12 | 43 | 42 | 21 | 21 | 2.0 | 2.0 |
| Fluid composition (16) | Disperse-phase particles (16) | 5 | 37 | 36 | 23 | 24 | 1.6 | 1.5 |
| Fluid composition (17) | Disperse-phase particles (17) | 6 | 38 | 38 | 24 | 22 | 1.6 | 1.7 |
| Fluid composition (18) | Disperse-phase particles (18) | 50 | 62 | 61 | 20 | 20 | 3.1 | 3.1 |
| Fluid composition (19) | Disperse-phase particles (19) | 50 | 69 | 69 | 21 | 22 | 3.3 | 3.1 |
| Fluid composition for comparison (6) | Disperse-phase particles for comparison (6) | 50 | 29 | Measurement impossible* | 43 | Measurement impossible* | 0.7 | — |
| Fluid composition for comparison (7) | Disperse-phase particles for comparison (7) | 50 | 47 | Measurement impossible** | 71 | Measurement impossible** | 0.7 | — |
| Fluid composition for comparison (8) | Disperse-phase particles for comparison (8) | 50 | 49 | Measurement impossible** | 73 | Measurement impossible** | 0.7 | — |
| Fluid composition (20) | Disperse-phase particles (20) | 65 | 64 | 65 | 23 | 24 | 2.8 | 2.7 |
| Fluid composition (21) | Disperse-phase particles (21) | 11 | 43 | 43 | 20 | 21 | 2.2 | 2.0 |
| Fluid composition (22) | Disperse-phase particles (22) | 11 | 44 | 45 | 22 | 23 | 2.0 | 2.0 |
| Fluid composition (23) | Disperse-phase particles (23) | 5 | 38 | 37 | 24 | 24 | 1.6 | 1.5 |
| Fluid composition (24) | Disperse-phase particles (24) | 6 | 39 | 40 | 23 | 24 | 1.7 | 1.7 |
| Fluid composition (25) | Disperse-phase particles (25) | 50 | 68 | 68 | 22 | 23 | 3.1 | 3.0 |
| Fluid composition (26) | Disperse-phase particles (26) | 50 | 60 | 59 | 20 | 21 | 3.0 | 2.8 |
| Fluid composition (27) | Disperse-phase particles (27) | 12 | 40 | 39 | 20 | 19 | 2.0 | 2.1 |
| Fluid composition (28) | Disperse-phase particles (28) | 50 | 63 | 62 | 22 | 22 | 2.9 | 2.8 |
| Fluid composition (29) | Disperse-phase particles (29) | 12 | 38 | 37 | 20 | 19 | 1.9 | 1.9 |
| Fluid composition (30) | Disperse-phase particles (30) | 50 | 67 | 67 | 23 | 24 | 2.9 | 2.8 |
| Fluid composition (31) | Disperse-phase particles (31) | 50 | 68 | 69 | 22 | 23 | 3.1 | 3.0 |
| Fluid composition (32) | Disperse-phase particles (32) | 50 | 68 | 70 | 21 | 22 | 3.2 | 3.2 |
| Fluid composition (33) | Disperse-phase particles (33) | 50 | 67 | 68 | 23 | 24 | 3.1 | 3.0 |
| Fluid composition (34) | Disperse-phase particles (34) | 68 | 68 | 69 | 21 | 23 | 3.2 | 3.0 |
| Fluid composition (35) | Disperse-phase particles (35) | 10 | 56 | 57 | 19 | 21 | 2.9 | 2.7 |
| Fluid composition (36) | Disperse-phase particles (36) | 4 | 42 | 43 | 24 | 25 | 1.8 | 1.7 |
| Fluid composition (37) | Disperse-phase particles (37) | 5 | 44 | 43 | 23 | 24 | 1.9 | 1.8 |
| Fluid Composition for comparison (9) | Desperse-phase particles for comparison (9) | 50 | 48 | Measurement impossible* | 72 | Measurement impossible* | 0.7 | — |
| Fluid Composition for comparison (10) | Desperse-phase particles for comparison (10) | 50 | 47 | Measurement impossible* | 70 | Measurement impossible* | 0.7 | — |
| Fluid Composition | Desperse-phase | 68 | 46 | Measurement | 46 | Measurement | 1.0 | — |

TABLE 1-continued

| Electrorheological fluid composition to be evaluated | Disperse-phase particles contained in electrorheological composition | Average particle-size of disperse phase particles ($\mu$m) | Shear stress (g/cm$^2$) | | Current density ($\mu$A/cm$^2$) | | Z value (g/$\mu$A) | |
|---|---|---|---|---|---|---|---|---|
| | | | Initial | After 7 days | Initial | After 7 days | Initial | After 7 days |
| for comparison (11) | particles for comparison (11) | | | impossible** | | impossible** | | |
| Fluid Composition for comparison (12) | Desperse-phase particles for comparison (12) | 10 | 42 | Measurement impossible** | 47 | Measurement impossible** | 0.9 | — |
| Fluid Composition for comparison (13) | Desperse-phase particles for comparison (13) | 4 | 36 | Measurement impossible** | 42 | Measurement impossible** | 0.9 | — |
| Fluid Composition for comparison (14) | Desperse-phase particles for comparison (14) | 5 | 40 | Measurement impossible** | 48 | Measurement impossible** | 0.8 | — |

*After 3 days current density exceeded 3,000 $\mu$A/cm$^2$, so measurement became impossible.
**After 6 days current density exceeded 3,000 $\mu$A/cm$^2$, so measurement became impossible.

The average particle diameters of the disperse-phase particles (1) to (37) contained respectively in the fluid composition (1) to (37) and the disperse-phase particles for comparison (1) to (14) contained respectively in the fluid compositions for comparison (1) to (14) are also shown in Table 1.

The desirability of an electrorheological fluid grows with the excellence in shear stress properties as manifested in the largeness of shear stress generated in response to application of even a relatively weak electric field or with the excellence in electric current properties as manifested in the smallness of the density of electric current allowed to flow in the presence of the shear stress, and particularly with the excellence in both the shear stress properties and the electric current properties. In the judgment of relative merits of an electrorheological fluid by simultaneous evaluation of these shear stress properties and electric current properties, the ratio of the magnitude of shear stress generated in response to application of a stated electric field to that of density of electric current allowed to flow in the presence of the shear stress, namely (magnitude of shear stress)/(density of electric current), (hereinafter this ratio will be referred to as "Z value") constitutes itself a useful parameter. To be specific, an electrorheological fluid which excels in both shear stress properties and density of electric current properties has a large Z value.

The Z values of the fluid compositions (1) to (37) and the fluid compositions for comparison (1) to (14) calculated from the values of shear stress and those of density of electric current found at the initiation and end of the aforementioned experiment of 7 days' continued application of en electric current of 4,000 V/mm are shown in Table 1.

It is clearly noted from Table 1 that the electrorheological fluids (1) to (37) conforming to the present invention excelled in shear stress properties manifested in largeness of the shear stress generated in response to the application of even the relatively weak electric field and in electric current properties manifested in smallness of the density of electric current allowed to flow in the presence of the shear stress and, at the same time, and excelled prominently in ability to stabilize the generated shear stress and density of electric current enough to defy the effect of aging. Further, the fact that the initial Z values all of the fluid compositions (1) to (37) were not smaller than 1.1 is a clear indication that these compositions were electrorheological fluids possessing balanced magnitudes of shear stress properties and electric current properties. Then, the fact that the terminal Z values of all the fluid compositions (1) to (37) were not smaller than 1.1 also clearly indicates that these electrorheological fluids excelled in the ability to stabilize the balance of shear stress properties and electric current properties enough to defy the effect of aging.

In contrast to the fluid compositions (1) to (37) conforming to the present invention, the fluid compositions for comparison (1) to (14) generated no large shear stress in response to the application of the relatively weak electric field, suffered a large increase in the density of electric current in the presence of the shear stress, betrayed a poor ability to stabilize the generated shear stress and density of electric current enough to withstand the effect of aging, and failed the experiment after 3 days or 6 days following the start of application of the electric field owing to the poor stability. Further, the fluid compositions for comparison (1) to (14) showed initial Z values in the range of from 0.6 to 1.0, indicating that these compositions were inferior to the fluid compositions of this invention in balance between shear stress properties and electric current properties.

What is claimed is:

1. An electrorheological fluid composition comprising a dispersion of disperse-phase particles formed of a sulfonated polymer possessing aromatic rings substituted with sulfonic acid groups in an electrically non-conducting oil which electrorheological fluid is characterized by the fact that the number of sulfonic acid groups in said sulfonated polymer forming said disperse-phase particles exceeds the number of aromatic rings present in said sulfonated polymer, the ratio of said disperse-phase particles to said electrically non-conducting oil is 50–500 to 100 in parts by weight, said disperse-phase particles having an average particle diameter in the range of from 0.1 to 100 $\mu$m, the ratio between the number of sulfonic acid groups to those of the aromatic groups being 105 to 200 per 100 aromatic rings present in the sulfonated polymer and the water content in the dispersed phase is 1.0 to 10 parts by weight, based on 100 parts by weight of the sulfonated polymer.

2. An electrorheological fluid composition according to claim 1, wherein said sulfonated polymer is obtained by sulfonation of the aromatic rings present in (I) a cross-linked polymer of (A) a monomer mixture having as main components thereof (a) a vinyl aromatic compound and (b) a polyvinyl compound and optionally containing (c) other vinyl compound.

3. An electrorheological fluid according to claim 2, wherein the proportions of (a) said vinyl aromatic compound and (b) said polyvinyl compound in (A) said monomer mixture are in ranges of from 50.0 to 99.9 mol % and from 50.0 to 0.1 mol %, respectively.

4. An electrorheological fluid composition according to claim 2, wherein (a) said vinyl aromatic compound comprises a vinyl aromatic compound possessing at least one electron-donating group on the aromatic ring thereof and said vinyl aromatic compound possessing at least one electron-donating group on the aromatic ring thereof accounts for a proportion of not less than 5.0 mol%, based on the amount of (A) said monomer mixture.

5. An electrorheological fluid composition according to claim 4, wherein said electron-donating group is an alkoxy group.

6. An electrorheological fluid composition according to claim 2, wherein said sulfonated polymer is obtained by sulfonation of (I) said cross-linked polymer with not less than 600 parts by weight of chlorosulfonic acid, based on 100 parts by weight of (I) said cross-linked polymer.

7. An electrorheological fluid composition according to claim 6, wherein said sulfonation is carried out by keeping (I) said cross-linked polymer in the presence of chlorosulfonic acid at a temperature of not lower than 70° C. for a period of not less than 30 minutes.

8. An electrorheological fluid composition according to claim 6, wherein said sulfonation is carried out by keeping (I) said cross-linked polymer in the presence of chlorosulfonic acid at a temperature not lower than −20° C. and lower than 70° C. for a period in the range of from 0.3 to 30 hours and further keeping the resulting reaction mixture at a temperature of not lower than 70° C. for a period of not less than 30 minutes.

9. An electrorheological fluid composition according to claim 2, wherein said sulfonated polymer is obtained by sulfonation of (I) said cross-linked polymer with not less than 150 parts by weight of fuming sulfuric acid, based on 100 parts by weight of (I) said cross-linked polymer.

10. An electrotheological fluid composition according to claim 9, wherein said sulfonation is carried out by keeping (I) said cross-linked polymer in the presence of fuming sulfuric acid at a temperature of not lower than 70° C. for a period of not less than 30 minutes.

11. An electrorheological fluid composition according to claim 9, wherein said sulfonation is carried out by keeping (I) said cross-linked polymer in the presence of fuming sulfuric acid at a temperature of not lower than −20° C. and lower than 70° C. for a period in the range of from 0.3 to 30 hours and further keeping the resulting reaction mixture at a temperature of not lower than 70° C. for a period of not less than 30 minutes.

12. An electrorheological fluid composition according to claim 2, wherein said sulfonated polymer is obtained by sulfonation of (I) said cross-linked polymer in the presence of a sulfonating agent and a transition metal salt.

13. An electrorheological fluid composition according to claim 12, wherein said sulfonation is carried out in the presence of a transition metal salt of an amount in the range of from 0.01 to 10 parts by weight, based on 100 parts by weight of (I) said cross-linked polymer.

14. An electrorheological fluid composition according to claim 13, wherein said sulfonation is carried out by keeping (I) said cross-linked polymer in the presence of a sulfonating agent and a transition metal salt at a tempeature of not lower than 60° C. for a period of not less than 30 minutes.

15. An electrorheological fluid composition according to claim 13, wherein said sulfonation is carried out by keeping (I) said cross-linked polymer in the presence of a sulfonating agent and a transition metal salt at a tempeature of not lower than −20° C. and lower than 60° C. for a period in the range of from 0.3 to 30 hours and further keeping the resulting reaction mixture at a temperature of not lower than 60° C. for a period of not less than 30 minutes.

16. An electrorheological fluid composition according to claim 2, wherein said sulfonated polymer is obtained by sulfonation of (I) said cross-linked polymer in the presence of a sulfonating agent and a pentavalent phosphorus compound.

17. An electrorheological fluid composition according to claim 16, wherein said sulfonation is carried out in the presence of a pentavalent phosphorus compound of an amount of not less than 1.0 part by weight based on 100 parts by weight of (I) said cross-linked polymer.

18. An electrorheological fluid composition according to claim 17, wherein said sulfonation is carried out by keeping (I) said cross-linked polymer in the presence of a sulfonating agent and a pentavalent phosphorus compound at a temperature of not lower than 60° C. for a period of not less than 30 minutes.

19. An electrorheological fluid composition according to claim 17, wherein said sulfonation is carried out by keeping (I) said cross-linked polymer in the presence of a sulfonating agent and a pentavalent phosphorus compound at a temperature of not lower than −20° C. and lower than 60° C. for a period in the range of from 0.3 to 30 hours and further keeping the resulting reaction mixture at a temperature of not lower than 60° C. for a period of not less than 30 minutes.

20. An electrorheological fluid composition according to claim 1, wherein said sulfonated polymer is obtained by mixing particles of a dry sulfonated polymer intermediate with a sulfonating agent and then subjecting the resultant mixture to additional sulfonation.

21. An electrorheological fluid composition according to claim 20, wherein said sulfonated polymer is obtained by subjecting said dry sulfonated polymer intermediate to additional sulfonation with chlorosulfonic acid and/or fuming sulfuric acid of an amount of not less than 100 parts by weight, based on 100 parts by weight of the particles of said dry sulfonated polymer intermediate.

22. An electrorheological fluid composition according to claim 20 or claim 21, wherein the particles of said dry sulfonated polymer intermediate are obtained by sulfonating the particles of (I) a cross-linked polymer of (A) a monomer mixture having as main components thereof (a) a vinyl aromatic compound and (b) a polyvinyl compound and optionally containing (c) other vinyl compound with a sulfonating agent, and separating the produced particles from the reaction mixture and drying the separated particles.

23. An electrorheological fluid composition according to claim 22, wherein the proportions of (a) said vinyl aromatic compound and (b) said polyvinyl compound is (A) said monomer mixture are in ranges of from 50.0 to 99.9 mol % and from 50.0 to 0.1 mol %, respectively.

* * * * *